United States Patent
Abotabl et al.

(10) Patent No.: US 11,832,270 B2
(45) Date of Patent: Nov. 28, 2023

(54) BANDWIDTH PART BASED UPLINK AND DOWNLINK COMMUNICATION IN A TIME RESOURCE

(71) Applicant: QUALCOMM Incorporated, San Diego, CA (US)

(72) Inventors: Ahmed Attia Abotabl, San Diego, CA (US); Krishna Kiran Mukkavilli, San Diego, CA (US); Muhammad Sayed Khairy Abdelghaffar, San Jose, CA (US); Abdelrahman Mohamed Ahmed Mohamed Ibrahim, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 226 days.

(21) Appl. No.: 17/447,127

(22) Filed: Sep. 8, 2021

(65) Prior Publication Data

US 2023/0075417 A1    Mar. 9, 2023

(51) Int. Cl.
*H04W 72/23* (2023.01)
*H04L 5/14* (2006.01)
*H04W 72/044* (2023.01)
*H04W 72/1263* (2023.01)
*H04W 8/02* (2009.01)

(52) U.S. Cl.
CPC .............. *H04W 72/23* (2023.01); *H04L 5/14* (2013.01); *H04W 8/02* (2013.01); *H04W 72/044* (2013.01); *H04W 72/1263* (2013.01)

(58) Field of Classification Search
CPC ........ H04L 5/14; H04L 5/0098; H04W 72/23; H04W 72/044; H04W 72/1263; H04W 80/02

USPC ......................................................... 370/329
See application file for complete search history.

(56) References Cited

U.S. PATENT DOCUMENTS

| 2019/0132824 | A1 | 5/2019 | Jeon et al. |
| 2019/0132845 | A1 | 5/2019 | Babaei et al. |
| 2019/0313343 | A1 | 10/2019 | Molavianjazi et al. |
| 2019/0357085 | A1* | 11/2019 | Chervyakov ......... H04L 1/0009 |

(Continued)

FOREIGN PATENT DOCUMENTS

WO    WO-2021133678 A1    7/2021

OTHER PUBLICATIONS

Intel Corporation: "Remaining Aspects for Carrier Aggregation and Bandwidth Parts", 3GPP TSG RAN WG1 Meeting NR#3, R1-1716327, 3rd Generation Partnership Project, Mobile Competence Centre, 650, Route Des Lucioles, F-06921 Sophia-Antipolis Cedex, France, vol. RAN WG1, No. Nagoya, Japan, Sep. 18, 2017-Sep. 21, 2017, 7 Pages, Sep. 17, 2017, XP051339783, p. 4.

(Continued)

*Primary Examiner* — Rownak Islam
(74) *Attorney, Agent, or Firm* — QUALCOMM Incorporated

(57) ABSTRACT

Various aspects of the present disclosure generally relate to wireless communication. In some aspects, a user equipment (UE) may receive, from a base station, an indication that a downlink (DL) bandwidth part (BWP) and an uplink (UL) BWP are simultaneously active in a time resource. The UE may communicate with the base station via the DL BWP and the UL BWP simultaneously in the time resource in accordance with the indication. Numerous other aspects are described.

30 Claims, 12 Drawing Sheets

(56) References Cited

U.S. PATENT DOCUMENTS

| | | |
|---|---|---|
| 2019/0357260 A1 | 11/2019 | Cirik et al. |
| 2020/0281026 A1* | 9/2020 | Yan .................. H04W 74/0833 |
| 2020/0367107 A1 | 11/2020 | Shen |
| 2020/0403759 A1 | 12/2020 | Abdelghaffar et al. |
| 2021/0119745 A1 | 4/2021 | Li et al. |
| 2022/0191880 A1* | 6/2022 | Wei .................. H04W 72/0453 |

OTHER PUBLICATIONS

International Search Report and Written Opinion—PCT/US2022/074702—ISA/EPO—dated Dec. 21, 2022.

\* cited by examiner

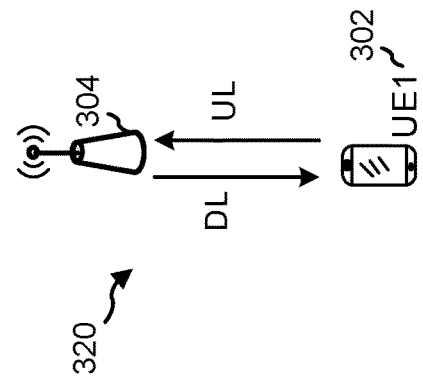
FIG. 3B
FIG. 3C
FIG. 3A

BANDWIDTH PART BASED UPLINK AND DOWNLINK COMMUNICATION IN A TIME RESOURCE

FIELD OF THE DISCLOSURE

Aspects of the present disclosure generally relate to wireless communication and to techniques and apparatuses for bandwidth part based uplink and downlink communication in a time resource.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving, from a base station, an indication that a downlink (DL) bandwidth part (BWP) and an uplink (UL) BWP are simultaneously active in a time resource. The method may include communicating with the base station via the DL BWP and the UL BWP simultaneously in the time resource in accordance with the indication.

Some aspects described herein relate to a method of wireless communication performed by a base station. The method may include transmitting, to a UE, an indication that a DL BWP and an UL BWP are simultaneously active in a time resource. The method may include communicating with the UE via the DL BWP and the UL BWP simultaneously in the time resource in accordance with the indication.

Some aspects described herein relate to a UE for wireless communication. The user equipment may include a memory and one or more processors coupled to the memory. The one or more processors may be configured to receive, from a base station, an indication that a DL BWP and an UL BWP are simultaneously active in a time resource. The one or more processors may be configured to communicate with the base station via the DL BWP and the UL BWP simultaneously in the time resource in accordance with the indication.

Some aspects described herein relate to a base station for wireless communication. The base station may include a memory and one or more processors coupled to the memory. The one or more processors may be configured to transmit, to a UE, an indication that a DL BWP and an UL BWP are simultaneously active in a time resource. The one or more processors may be configured to communicate with the UE via the DL BWP and the UL BWP simultaneously in the time resource in accordance with the indication.

Some aspects described herein relate to a non-transitory computer-readable medium that stores a set of instructions for wireless communication by a UE. The set of instructions, when executed by one or more processors of the UE, may cause the UE to receive, from a base station, an indication that a DL BWP and an UL BWP are simultaneously active in a time resource. The set of instructions, when executed by one or more processors of the UE, may cause the UE to communicate with the base station via the DL BWP and the UL BWP simultaneously in the time resource in accordance with the indication.

Some aspects described herein relate to a non-transitory computer-readable medium that stores a set of instructions for wireless communication by a base station. The set of instructions, when executed by one or more processors of the base station, may cause the base station to transmit, to a UE, an indication that a DL BWP and an UL BWP are simultaneously active in a time resource. The set of instructions, when executed by one or more processors of the base station, may cause the base station to communicate with the UE via the DL BWP and the UL BWP simultaneously in the time resource in accordance with the indication.

Some aspects described herein relate to an apparatus for wireless communication. The apparatus may include means for receiving, from a base station, an indication that a DL BWP and an UL BWP are simultaneously active in a time resource. The apparatus may include means for communicating with the base station via the DL BWP and the UL BWP simultaneously in the time resource in accordance with the indication.

Some aspects described herein relate to an apparatus for wireless communication. The apparatus may include means for transmitting, to a UE, an indication that a DL BWP and an UL BWP are simultaneously active in a time resource. The apparatus may include means for communicating with the UE via the DL BWP and the UL BWP simultaneously in the time resource in accordance with the indication.

Aspects generally include a method, apparatus, system, computer program product, non-transitory computer-readable medium, user equipment, base station, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 3A-3C are diagrams illustrating examples of full-duplex (FD) communication, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
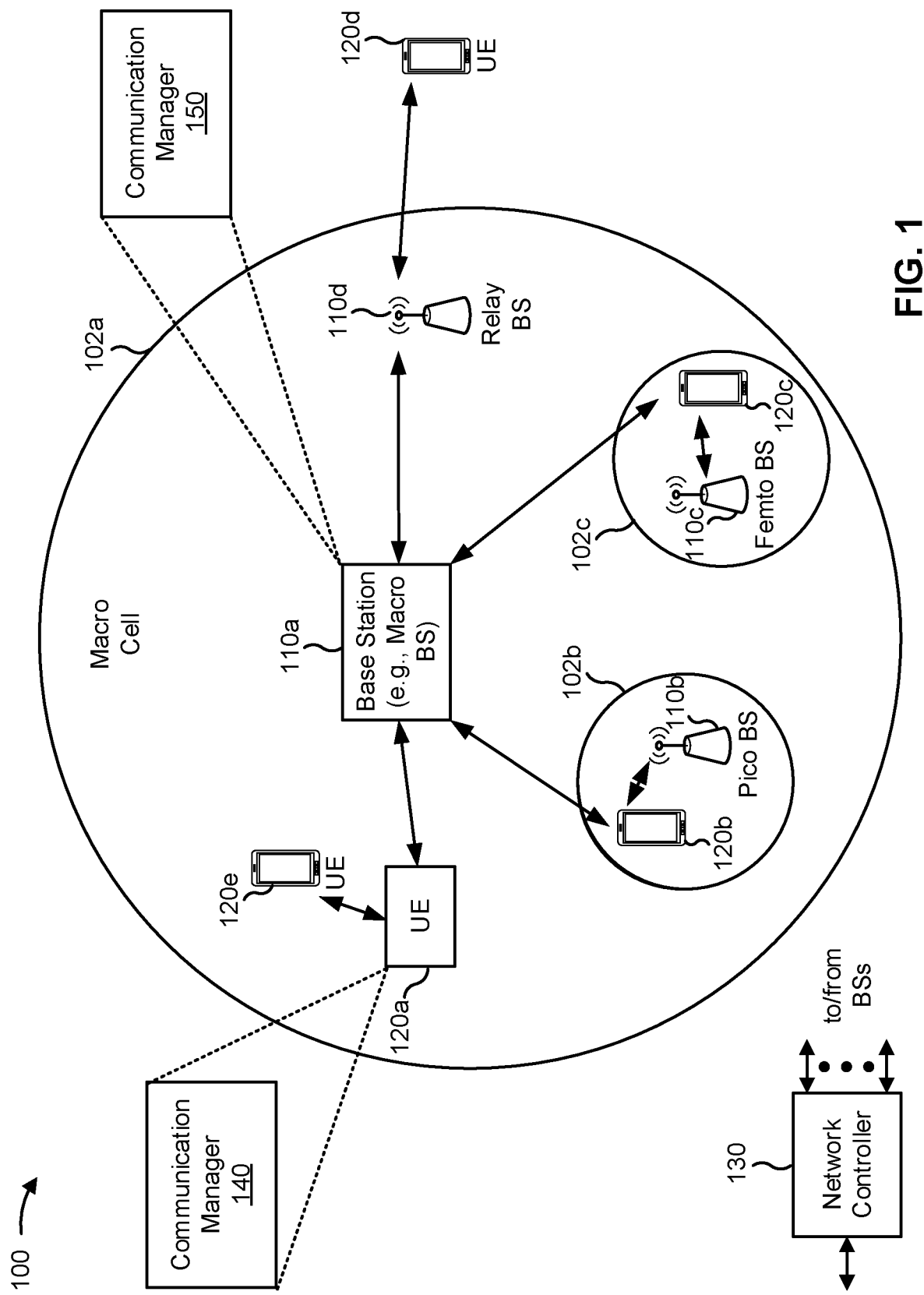
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive, from a base station, an indication that a downlink (DL) bandwidth part (BWP) and an uplink (UL) BWP are simultaneously active in a time resource; and communicate with the base station via the DL BWP and the UL BWP simultaneously in the time resource in accordance with the indication. Additionally, or alternatively, the communication manager 140 may perform one or more other operations described herein.

In some aspects, the base station 110 may include a communication manager 150. As described in more detail elsewhere herein, the communication manager 150 may transmit, to a UE, an indication that a DL BWP and an UL BWP are simultaneously active in a time resource; and communicate with the UE via the DL BWP and the UL BWP simultaneously in the time resource in accordance with the indication. Additionally, or alternatively, the communication manager 150 may perform one or more other operations described herein.

As indicated above, FIG. 1 is provided as an example. Other examples may differ from what is described with regard to FIG. 1.

Figure 2:
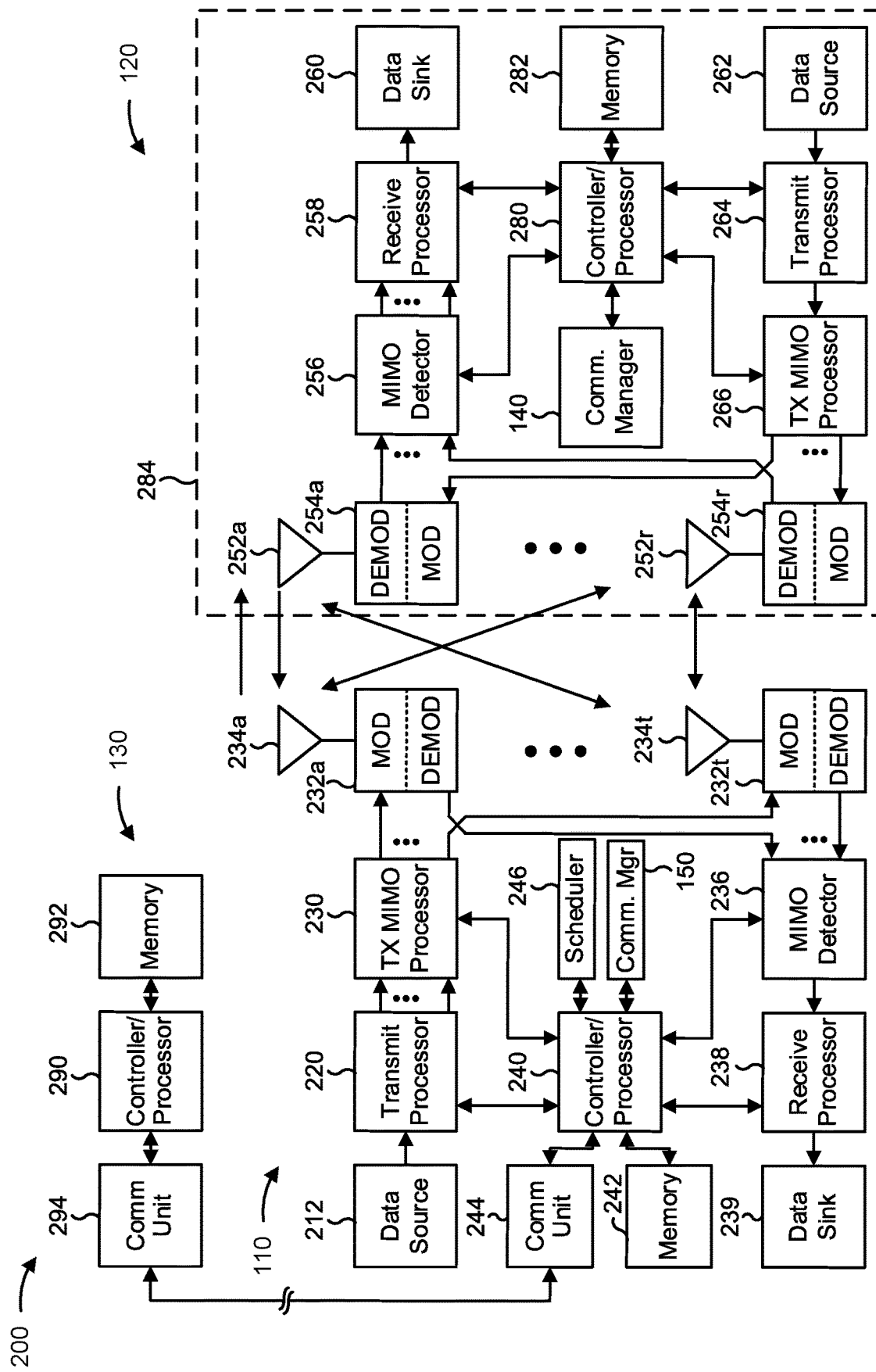
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 3-12).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 3-12).

The controller/processor 240 of the base station 110, the controller/processor 280 of the UE 120, and/or any other component(s) of FIG. 2 may perform one or more techniques associated with bandwidth part based uplink and downlink communication in a time resource, as described in more detail elsewhere herein. For example, the controller/processor 240 of the base station 110, the controller/processor 280 of the UE 120, and/or any other component(s) of FIG. 2 may perform or direct operations of, for example, process 900 of FIG. 9, process 1000 of FIG. 10, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 900 of FIG. 9, process 1000 of FIG. 10, and/or other processes as described herein. In some examples, executing instructions may include running the instructions, converting the instructions, compiling the instructions, and/or interpreting the instructions, among other examples.

In some aspects, the UE 120 includes means for receiving, from a base station, an indication that a DL BWP and an UL BWP are simultaneously active in a time resource; and/or means for communicating with the base station via the DL BWP and the UL BWP simultaneously in the time resource in accordance with the indication. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station 110 includes means for transmitting, to a UE 120, an indication that a DL BWP and an UL BWP are simultaneously active in a time resource; and/or means for communicating with the UE via the DL BWP and the UL BWP simultaneously in the time resource in accordance with the indication. The means for the base station 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

FIGS. 3A-3C are diagrams illustrating examples 300, 310, 320 of full-duplex (FD) communication, in accordance with the present disclosure. The example 300 of FIG. 3A includes a UE1 302 and two base stations (e.g., TRPs) 304-1, 304-2, where the UE1 302 is sending UL transmissions to base station 304-1 and is receiving DL transmissions from base station 304-2. In the example 300 of FIG. 3A, FD is enabled for the UE1 302, but not for the base stations 304-1, 304-2. The example 310 of FIG. 3B includes two UEs, shown as UE1 302-1 and UE2 302-2, and a base station 304, where the UE1 302-1 is receiving a DL transmission from the base station 304 and the UE2 302-2 is transmitting an UL transmission to the base station 304. In the example 310 of FIG. 3B, FD is enabled for the base station 304, but not for UE1 302-1 and UE2 302-2. The example 320 of FIG. 3C includes a UE1 302 and a base station 304, where the UE1 302 is receiving a DL transmission from the base station 304 and the UE1 302 is transmitting an UL transmission to the base station 304. In the example 320 of FIG. 3C, FD is enabled for both the UE1 302 and the base station 304. Some techniques and apparatuses described herein improve full-duplex communication, such as by increasing throughput and increasing network resource utilization.

As indicated above, FIGS. 3A-3C are provided as one or more examples. Other examples may differ from what is described with regard to FIGS. 3A-3C.

Figure 4:
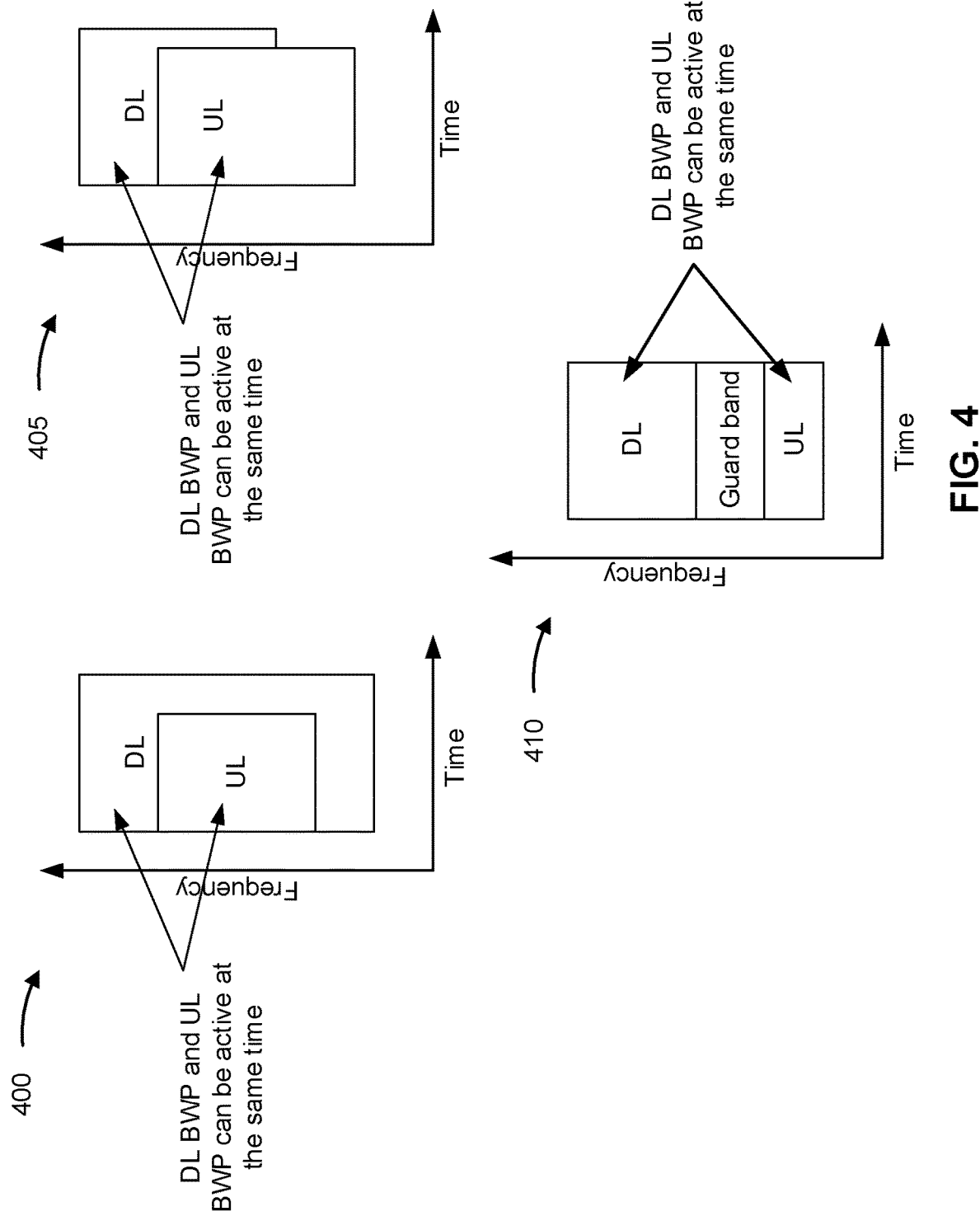
FIG. 4 is a diagram illustrating examples of full-duplex communication in a wireless network, in accordance with the present disclosure.

FIG. 4 is a diagram illustrating examples 400, 405, and 410 of full-duplex communication in a wireless network, in accordance with the present disclosure. "Full-duplex communication" in a wireless network refers to simultaneous bi-directional communication between devices in the wireless network. For example, a UE operating in a full-duplex mode may transmit an uplink communication and receive a downlink communication at the same time (e.g., in the same slot or the same symbol). "Half-duplex communication" in a wireless network refers to unidirectional communications (e.g., only downlink communication or only uplink communication) between devices at a given time (e.g., in a given slot or a given symbol).

As shown in FIG. 4, examples 400 and 405 show examples of in-band full-duplex (IBFD) communication. In IBFD, a UE may transmit an uplink communication to a base station and receive a downlink communication from the base station on the same time and frequency resources. As shown in example 400, in a first example of IBFD, the time and frequency resources for uplink communication may fully overlap with the time and frequency resources for downlink communication. As shown in example 405, in a second example of IBFD, the time and frequency resources for uplink communication may partially overlap with the time and frequency resources for downlink communication.

As further shown in FIG. 4, example 410 shows an example of sub-band full-duplex (SBFD) communication, which may also be referred to as "sub-band frequency division duplex (SBFDD)" or "flexible duplex." In SBFD, a UE may transmit an uplink communication to a base station and receive a downlink communication from the base station at the same time, but on different frequency resources. For example, the different frequency resources may be sub-bands of a frequency band, such as a time division duplexing band. In this case, the frequency resources used for downlink communication may be separated from the frequency resources used for uplink communication, in the frequency domain, by a guard band.

Some techniques and apparatuses described herein improve full-duplex communication, such as by increasing throughput and increasing network resource utilization. For example, as shown in FIG. 4, some techniques and apparatuses described herein enable an uplink bandwidth part (BWP) and a downlink BWP to be active at the same time.

As indicated above, FIG. 4 is provided as an example. Other examples may differ from what is described with respect to FIG. 4.

Figure 5:
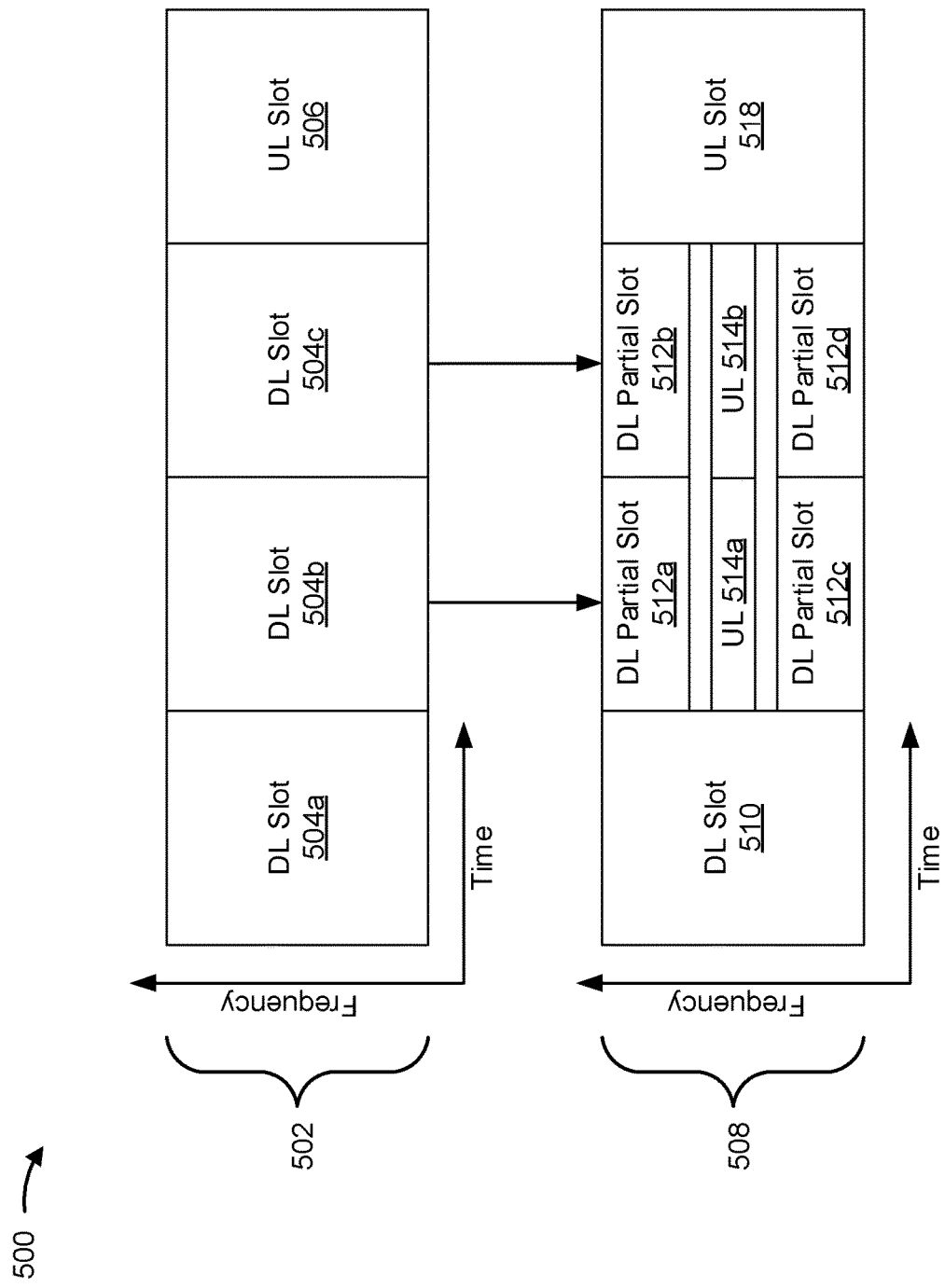
FIG. 5 is a diagram illustrating an example of slot based full duplex (SBFD) activation, in accordance with the present disclosure.

FIG. 5 is a diagram illustrating an example 500 of SBFD activation, in accordance with the present disclosure. As shown in FIG. 5, example 500 includes a first configuration 502. In some aspects, the first configuration 502 may indicate a first slot format pattern (sometimes called a TDD pattern) associated with a half-duplex mode or a full-duplex mode. The first slot format pattern may include a quantity of downlink slots (e.g., three downlink slots 504a, 504b, and 504c, as shown), a quantity of flexible slots (not shown), and/or a quantity of uplink slots (e.g., one uplink slot 506, as shown). The first slot format pattern may repeat over time. In some aspects, a base station 110 may indicate the first slot format pattern to a UE 120 using one or more slot format indicators. A slot format indicator, for a slot, may indicate whether that slot is an uplink slot, a downlink slot, or a flexible slot, among other examples.

A base station 110 may instruct (e.g., using an indication, such as a radio resource control (RRC) message, a medium access control (MAC) control element (CE) (MAC-CE), or downlink control information (DCI)) a UE 120 to switch from the first configuration 502 to a second configuration 508. As an alternative, the UE 120 may indicate to the base station 110 that the UE 120 is switching from the first configuration 502 to the second configuration 508. The second configuration 508 may indicate a second slot format pattern that repeats over time, similar to the first slot format pattern. In any of the aspects described above, the UE 120 may switch from the first configuration 502 to the second configuration 508 during a time period (e.g., a quantity of symbols and/or an amount of time (e.g., in ms)) based at least in part on an indication received from the base station 110 (e.g., before switching back to the first configuration 502). During that time period, the UE 120 may communicate using the second slot format pattern, and then may revert to using the first slot format pattern after the end of the time period. The time period may be indicated by the base station 110 (e.g., in the instruction to switch from the first configuration 502 to the second configuration 508, as described above) and/or based at least in part on a programmed and/or otherwise preconfigured rule. For example, the rule may be based at least in part on a table (e.g., defined in 3GPP specifications and/or another wireless communication standard) that associates different sub-carrier spacings (SCSs) and/or numerologies (e.g., represented by μ and associated with corresponding SCSs) with corresponding time periods for switching configurations.

In example 500, the second slot format pattern includes two SBFD slots in place of what were downlink slots in the first slot format pattern. In example 500, each SBFD slot includes a partial slot (e.g., a portion or sub-band of a frequency allocated for use by the base station 110 and the UE 120) for downlink (e.g., partial slots 512a, 512b, 512c, and 512d, as shown) and a partial slot for uplink (e.g., partial slots 514a and 514b, as shown). Accordingly, the UE 120 may operate using the second slot format pattern to transmit an uplink communication in an earlier slot (e.g., the second slot in sequence, shown as partial UL slot 514a) as compared to using the first slot format pattern (e.g., the fourth slot in sequence, shown as UL slot 506). Other examples may include additional or alternative changes. For example, the second configuration 508 may indicate an SBFD slot in place of what was an uplink slot in the first configuration 502 (e.g., UL slot 506). In another example, the second configuration 508 may indicate a downlink slot or an uplink slot in place of what was an SBFD slot in the first configuration 502 (not shown in FIG. 5). In yet another example, the second configuration 508 may indicate a downlink slot or an uplink slot in place of what was an uplink slot or a downlink slot, respectively, in the first configuration 502. An "SBFD slot" may refer to a slot in which an SBFD format is used. An SBFD format may include a slot format in which full duplex communication is supported (e.g., for both uplink and downlink communications), with one or more frequencies used for an uplink portion of the slot being separated from one or more frequencies used for a downlink portion of the slot by a guard band. In some aspects, the SBFD format may include a single uplink portion and a single downlink portion separated by a guard band (e.g., as shown in FIG. 4). In some aspects, the SBFD format may include multiple downlink portions and a single uplink portion that is separated from the multiple downlink portions by respective guard bands (e.g., as shown in FIG. 5). In some aspects, an SBFD format may include multiple uplink portions and a single downlink portion that is separated from the multiple uplink portions by respective guard bands. In some aspects, the SBFD format may include multiple uplink portions and multiple downlink portions, where each uplink portion is separated from a downlink portion by a guard band. In some aspects, operating using an SBFD mode may include activating or using an FD mode in one or more slots based at least in part on the one or more slots having the SBFD format. A slot may support the SBFD mode if an UL BWP and a DL BWP are permitted to be or are simultaneously active in the slot in an SBFD fashion (e.g., with guard band separation).

By switching from the first configuration 502 to the second configuration 508, the base station 110 and the UE 120 may experience increased quality and/or reliability of communications. For example, the base station 110 and the UE 120 may experience increased throughput (e.g., using a full-duplex mode), reduced latency (e.g., the UE 120 may be able to transmit an uplink and/or a downlink communication sooner using the second configuration 508 rather than the first configuration 502), and increased network resource utilization (e.g., by using both the DL BWP and the UL BWP simultaneously instead of only the DL BWP or the UL BWP). The techniques described herein use an indication from the base station 110 to the UE 120 to instruct the UE 120 to operate using an SBFD mode, such as that shown in the second configuration 508.

As indicated above, FIG. 5 is provided as an example. Other examples may differ from what is described with respect to FIG. 5.

A communication system or network may enable two or more devices, such as a UE and a base station, to communicate with each other using one or more time resources, such as slots. Transmissions from the UE to the base station are known as uplink (UL) transmissions, and transmissions from the base station to the UE are known as downlink (DL) transmissions. A UE may be configured with multiple DL BWPs (e.g., up to four) and/or multiple UL BWPs (e.g., up to four). However, only one BWP may be active at a time to reduce complexity and reduce ambiguity in communications between the UE and the base station (e.g., which can only occur on the active BWP). Once a BWP has been active, the UE does not expect to receive or transmit communications outside of the active BWP, and the active BWP can be used for communications. BWPs can be activated or deactivated on a dynamic basis (such as via DCI or information indicating slots in which a BWP is active), or on a semi-static basis (such as via RRC signaling or semi-persistent scheduling).

In some examples, a time-division duplex (TDD) pattern may be configured for the UE. A TDD pattern is a pattern of slot formats (e.g., downlink slot, uplink slot, or flexible slot) for a number of slots, such as is shown in FIG. 5. The TDD pattern may be applied to all configured BWPs in a frequency band or for a component carrier (CC). For example, the UE may receive, from the base station, a configuration of a plurality of BWPs in a frequency band, and the configuration may identify a respective BWP-specific TDD pattern for each BWP of the plurality of BWPs. The UE and the base station may communicate in one or more active BWPs using the respective BWP-specific TDD patterns for each of the one or more active BWPs As described herein, a communication system that enables two or more devices to communicate with each other in both directions (e.g., uplink and downlink) is referred to as a duplex communication system. A duplex communication system can include a full-duplex system or a half-duplex system. In some examples, a half-duplex system enables both the UE and the base station to communicate with each other, but not simultaneously. In other words, at a given time, the UE may transmit to the base station on the UL, or the base station may transmit to the UE on the DL, but not simultaneously. This method of communication presents numerous problems, such as bandwidth and throughput constraints, and limiting the total number of devices that are able to communicate over the network. In a full-duplex system, both the UE and the base station can communicate with each other simultaneously on the DL and the UL. By allowing the UE and the base station to communicate on the DL and the UL simultaneously, full-duplex communication systems may double the available bandwidth.

However, full-duplex communication may introduce its own set of problems. For example, there may be no specific time resource that is dedicated to full-duplex communication, and introducing such a time resource (such as via defining a dedicated slot type of a TDD pattern or a carrier aggregation based solution) would require highly complex signaling, would require extensive changes to existing devices and infrastructure, and would reduce backward compatibility. Another example is the problem of self-interference. Self-interference results when the power of a signal is not completely contained within its intended frequency band. For example, the signal that appears at the receiver may be subject to leakage (e.g., the signal traveling directly from the transmitter to the receiver) and local reflections. This is highly undesirable because the transmission from the UE to the base station on the UL BWP could interfere with the transmission from the base station to the UE on the DL BWP, resulting in a significant reduction in the quality of communication between the devices.

Some techniques and apparatuses described herein enable full-duplex communications through the introduction of an indication (e.g., a radio resource control message, a MAC control element, downlink control information, etc.) that instructs the device to simultaneously activate the DL BWP and the UL BWP. By providing a way to define time resources as full-duplex (e.g., SBFD) time resources, the UE can determine, ahead of time, that it needs to be in full-duplex mode for these resources so that it can configure itself accordingly.

In some aspects, the base station may transmit, to the UE, an indication that the DL BWP and the UL BWP are simultaneously active in a time resource, and the base station and the UE may thereafter communicate via the DL BWP and the UL BWP simultaneously in the time resource in accordance with the indication. The simultaneous activation of the BWPs may occur in a time resource that was previously scheduled for an existing DL BWP or UL BWP, or that was not scheduled for any BWP, thereby eliminating the need for complex signaling and reducing impact on existing configurations, such as TDD patterns. In some aspects, at least one of the UE or the base station may reduce a portion of the bandwidth allocated to the DL BWP and/or the UL BWP. For example, the UE may increase the size of a guard band between the DL BWP and the UL BWP, which may reduce self-interference when the bandwidths of the DL BWP and the UL BWP are too close to each other in frequency. Reducing the portion of the bandwidth allocated to the DL BWP and/or the UL BWP may reduce or eliminate the problem of self-interference, such as by providing a guard band sufficient to contain leakage of the transmission between a transmitter and a receiver of the device. Simultaneous activation of the DL BWP and the UL BWP increases bandwidth, throughput, and the total number of devices that are capable of communicating over that network, while avoiding the need for complex signaling and reducing self-interference in the transmissions. Therefore, the quality of communications between the devices is greatly improved.

Figure 6:
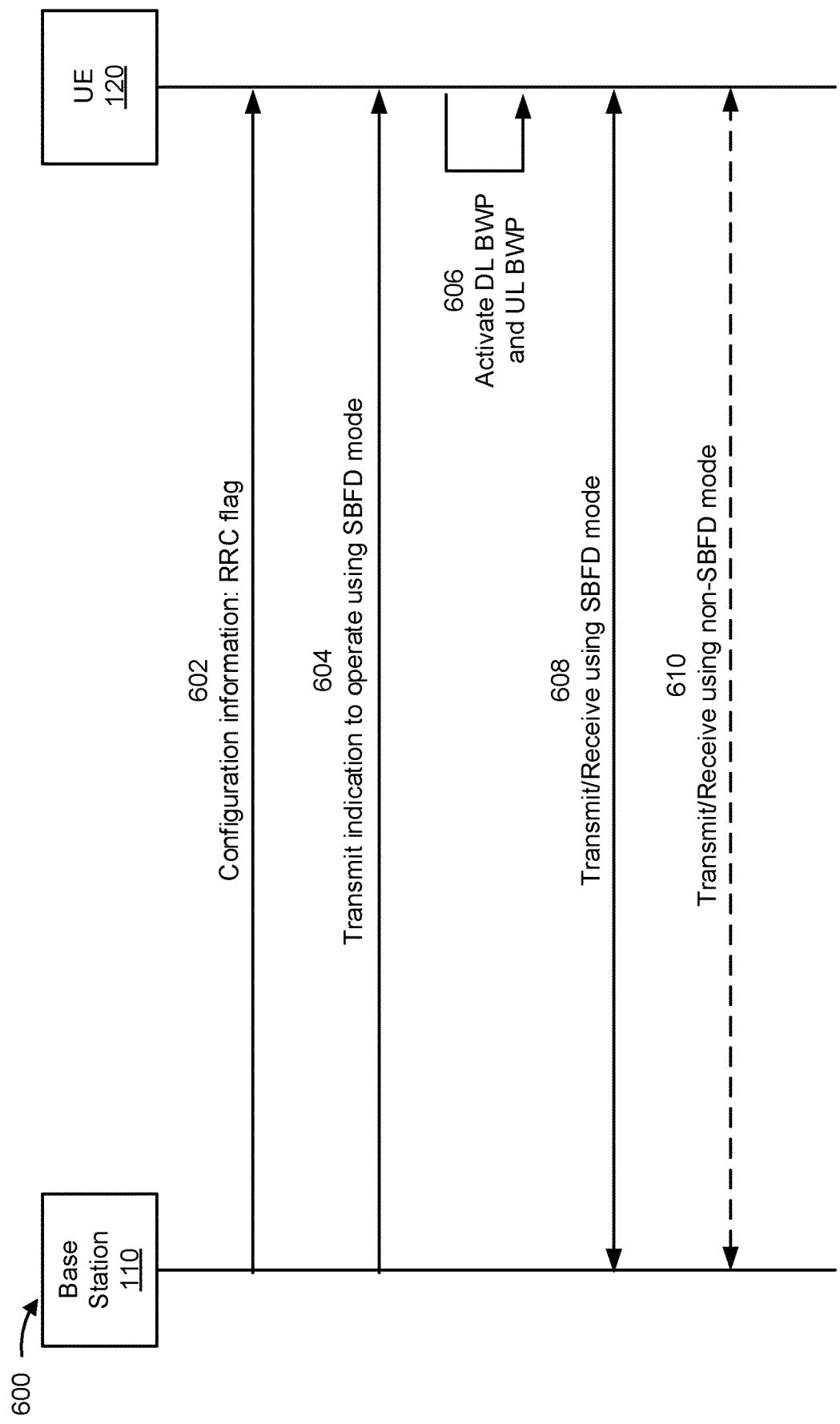
FIG. 6 is a diagram illustrating an example associated with bandwidth part based uplink and downlink communication in a time resource, in accordance with the present disclosure.

FIG. 6 is a diagram illustrating an example 600 associated with bandwidth part based uplink and downlink communication in a time resource, in accordance with the present disclosure. As shown in FIG. 6, a base station, such as the base station 110, and a UE, such as the UE 120, may communicate with one another.

As shown in connection with reference number 602, a base station 110 may transmit, to a UE 120, configuration information associated with an RRC flag. RRC is a protocol with functions that may include connection establishment and release functions, broadcast of system information, radio bearer establishment, reconfiguration and release, connection mobility procedures, paging notification and release, and outer loop power control, among other examples. In some aspects, the base station 110 may transmit the configuration information in an RRC message, such as an RRC configuration message or an RRC reconfiguration message. The UE 120 may be configured with (e.g., based at least in part on a message from the base station) and/or may store an RRC flag that specifies whether a DL BWP and an UL BWP can be (e.g., are permitted to be) simultaneously active. The DL BWP may be used by the base station 110 for transmitting to the UE 120. The UL BWP may be used by the UE 110 for transmitting to the base station 110. In some aspects, the DL BWP and the UL BWP are configured for the same carrier (e.g., cell, or component carrier (CC)). In some aspects, the DL BWP and the UL BWP are configured for different carriers (e.g., the DL BWP may be configured for a first carrier and the UL BWP may be configured for a second carrier).

In some aspects, the RRC flag may have two or more states. In a first one of the RRC flag states (e.g., an active state), the RRC flag may indicate that the UE 120 is permitted to operate using a full-duplex (e.g., SBFD) slot format. As described herein, operating using an SBFD mode may include activating or using an FD mode in one or more slots that have an SBFD slot format (e.g., as described above in connection with FIG. 5). In a second one of the RRC flag states (e.g., an inactive state), the RRC flag may indicate that the UE 120 is not permitted to operate using the SBFD mode. The configuration information transmitted by the base station 110 may instruct the UE 120 to set the RRC flag to an active state or to an inactive state. Additionally, or alternatively, reception of the configuration information by the UE 120 may set the RRC flag (e.g., stored by the UE 120) to the active or inactive state. In some aspects, the UE 120 may only operate in the SBFD mode if the RRC flag is set to the active state.

In some aspects, the configuration information may include information configuring a set of UL BWPs and a set of DL BWPs. For example, the configuration information may include parameters configuring a set of UL BWPs and a set of DL BWPs for one or more cells or carriers of the UE 120. Additionally, or alternatively, the UE 120 may receive configuration information for one or more DL BWPs or one or more UL BWPs separately from the configuration information indicated by reference number 602.

As shown in connection with reference number 604, the base station 110 may transmit, to the UE 120, an indication to operate in a full duplex mode (e.g., using an SBFD mode). In some aspects, the indication may indicate that the DL BWP and the UL BWP are to be used or are to be active simultaneously. The indication may be included in any of a plurality of message types. In some aspects, the indication may be included in an RRC message (e.g., an RRC configuration message, an RRC reconfiguration message, etc.) in accordance with the RRC protocol. Additionally, or alternatively, the indication may be included in a MAC-CE. Additionally, or alternatively, the indication may be included in DCI. The indication may be transmitted by the base station 110. The indication may be specific to the UE 120 and/or may be configured particularly for the UE 120 by the base station 110. The indication may additionally, or alternatively instruct the UE to operate in a full-duplex mode, such as using the SBFD mode.

In some aspects, the indication may indicate one or more sets of parameters. For example, the indication may indicate one or more parameters including an MCS, a beam, a transmit power parameter, a precoder, a rank indicator, a timing advance value, or a guard band. In some aspects, the indication may indicate multiple sets of parameters. A set of parameters can be indicated for a particular duplexing state (e.g., half-duplex mode or full-duplex mode). For example, the base station 110 may configure a first set of parameters for a full-duplex mode (e.g., associated with an SBFD mode) and a second set of parameters for a half-duplex mode. The UE 120 may switch between the full-duplex mode (associated with the first set of parameters) and the half-duplex mode (associated with the second set of parameters) based at least in part on whether a given time resource is indicated as associated with a simultaneously active DL BWP and UL BWP. As one example, the UE may use the full-duplex mode when a time resource is associated with a simultaneously active DL BWP and UL BWP, and may use the half-duplex mode otherwise. Other examples are provided below.

In some aspects, the UE 120 may be configured with an RRC flag that specifies whether the DL BWP and the UL BWP can be simultaneously activate. The UE 120 may be configured to activate the DL BWP and the UL BWP in accordance with the indication and based at least in part on the RRC flag specifying that the DL BWP and the UL BWP can be simultaneously activate. In some aspects, the UE 120 may be configured to de-activate at least one of the DL BWP and the UL BWP based at least in part on receiving a second indication that the DL BWP and the UL BWP are no longer simultaneously active. In some aspects, the UE 120 may activate the DL BWP and the UL BWP in accordance with the RRC flag itself. Thereafter, the UE 120 may receive a second indication that the DL BWP and the UL BWP are no longer simultaneously active. The UE 120 may be configured to de-activate, based at least in part on receiving the second indication, at least one of the DL BWP and the UL BWP.

As shown in connection with reference number 606, the DL BWP and the UL BWP may be activated such that the UL BWP and the DL BWP are simultaneously active (e.g., in one or more slots having an SBFD format). The DL BWP and the UL BWP may be activated by the base station 110 and/or by the UE 120, resulting in simultaneously active UL and DL BWPs. In some aspects, the UE 120 may activate the DL BWP and the UL BWP in accordance with the indication and based at least in part on the RRC flag specifying that the DL BWP and the UL BWP are permitted to be simultaneously active. In some aspects, the UE 120 may activate both the DL BWP and the UL BWP regardless of the state of the RRC flag. For example, the UE 120 may be capable of activating the DL BWP and the UL BWP irrespective of an RRC configuration of the UE 120 (e.g., without having received the RRC flag).

In some aspects, the indication may include reception of DCI that schedules a physical uplink shared channel (PUSCH) communication in a time resource that is configured as a downlink time resource (e.g., that has a downlink slot format). In this case, the UE 120 may activate the UL BWP in the time resource, in which the DL BWP may already be active, based at least in part on receiving the DCI that schedules the PUSCH communication. The time resource may be configured as a downlink time resource prior to reception of the DCI. In some aspects, the indication may indicate that a slot, configured as a DL slot, should include an UL BWP. Additional details are described below in connection with FIG. 7.

In some aspects, the indication may include reception of DCI that schedules a physical downlink shared channel (PDSCH) communication in a time resource that is configured as an uplink time resource (e.g., that has an uplink slot format). In this case, the UE 120 may activate the DL BWP in the time resource, in which the UL BWP may already be active, based at least in part on receiving the DCI that schedules the PDSCH communication. The time resource may be configured as an uplink time resource prior to reception of the DCI. In some aspects, the indication may indicate that a slot, configured as a UL slot, should include a DL BWP. Additional details are described below in connection with FIG. 7.

In some aspects, the indication may include reception of DCI that schedules both a PDSCH communication and a PUSCH communication in the time resource. The UE 120 may activate one of the DL BWP or the UL BWP in the time resource, in which the other of the DL BWP or the UL BWP may already be active, based at least in part on receiving the DCI that schedules both the PDSCH communication and the PUSCH communication. If neither BWP is active for the time resource, then the UE 120 may activate both of the DL BWP and the UL BWP. In some aspects, the indication may indicate that a slot, configured as a DL slot, should include a UL BWP. Additional details are described below in connection with FIG. 7.

In some aspects, at least one of the base station 110 or the UE 120 may reduce a bandwidth of the DL BWP and/or the UL BWP to reduce interference (e.g., self-interference) during SBFD communication. The bandwidth may be reduced based at least in part on a determination that a guard band between the DL BWP and the UL BWP cannot support (or is not sufficient to support) simultaneous communication on the DL BWP and the UL BWP with an acceptable level of interference. The bandwidth may be reduced by the base station 110 and/or the UE 120 based at least in part on an interference condition being satisfied, such as a threshold associated with an interference measurement being satisfied. Additional details are described below in connection with FIG. 8.

As shown in connection with reference number 608, the base station 110 and the UE 120 may communicate (e.g., transmit or receive) using the SBFD mode. The base station 110 and the UE 120 may communicate using the SBFD mode based at least in part on the DL BWP and the UL BWP being simultaneously active. For example, the base station 110 may transmit to the UE 120 on the DL BWP at the same time that the UE 120 is transmitting to the base station 110 on the UL BWP. As another example, the UE 120 may communicate with two or more devices (which may or may not include the base station 110) using the SBFD mode. The base station 110 and the UE 120 may continue to communicate using the SBFD mode, or may cease to communicate using the SBFD mode, based at least in part on the satisfaction of one or more conditions. For example, the base station 110 and the UE 120 may maintain the DL BWP and the UL BWP as active until an end of the time resource (e.g., the end of the slot) has been reached. As another example, the base station 110 and the UE 120 may maintain the DL BWP and the UL BWP as active until an indication to operate in a half-duplex mode is received (e.g., by the UE 120 from the base station 110). As another example, the base station 110 and the UE 120 may maintain the DL BWP and the UL BWP as active until an expiration of a timer, such as a timer stored by the base station 110 and/or a timer stored by the UE 120. In some aspects, a duration of the timer may be indicated to the UE 120 by the base station 110 (e.g., in the configuration information and/or the indication to operate using the SBFD mode).

As shown in connection with reference number 610, the base station 110 and the UE 120 may optionally communicate (e.g., transmit or receive) using a different mode other than the SBFD mode (e.g., a non-SBFD mode). In some aspects, the base station 110 and the UE 120 may communicate according to a slot format indicator (SFI) and/or a TDD pattern (sometimes referred to as a TDD uplink/ downlink common configuration or a TDD uplink/downlink dedicated configuration). The TDD pattern may indicate whether slots are to be used for DL communications, UL communications, or are flexible (meaning that an SFI carried in DCI can indicate whether one or more symbols of the slot can be used for DL transmission or UL transmissions). The SFI may indicate one or more parameters for communication within one or more slots, such as whether one or more symbols of the one or more slots should be used for DL transmissions or UL transmissions. Communicating according to the different mode may include returning to a previous mode (e.g., based at least in part on the TDD pattern and/or the SFI), such as a half-duplex mode, that was being used by the base station 110 and the UE 120 prior to receiving the indication to operate in the SBFD mode. Additionally, or alternatively, communicating according to the different mode may include the base station 110 indicating, to the UE 120, the different mode for use after the expiration of the SBFD mode. The base station 110 and the UE 120 may optionally communicate using the different mode after one or more of the conditions described above has been satisfied (e.g., end of the time resource, an indication to operate in a half-duplex mode, expiration of a timer, etc.). In some aspects, the base station 110 or the UE 120 may de-activate the DL BWP or the UL BWP based at least in part on receiving a second indication (e.g., in an RRC message, a MAC-CE, and/or DCI) that the DL BWP and the UL BWP are no longer to be simultaneously active. The second indication may include an indication that one or more of the conditions has been satisfied.

While FIG. 6 describes activating and using an SBFD mode, the techniques described therein may apply to other types of modes, such as other full-duplex modes, including but not limited to an in-band full duplex (IBFD) mode.

As indicated above, FIG. 6 is provided as an example. Other examples may differ from what is described with respect to FIG. 6.

Figure 7:
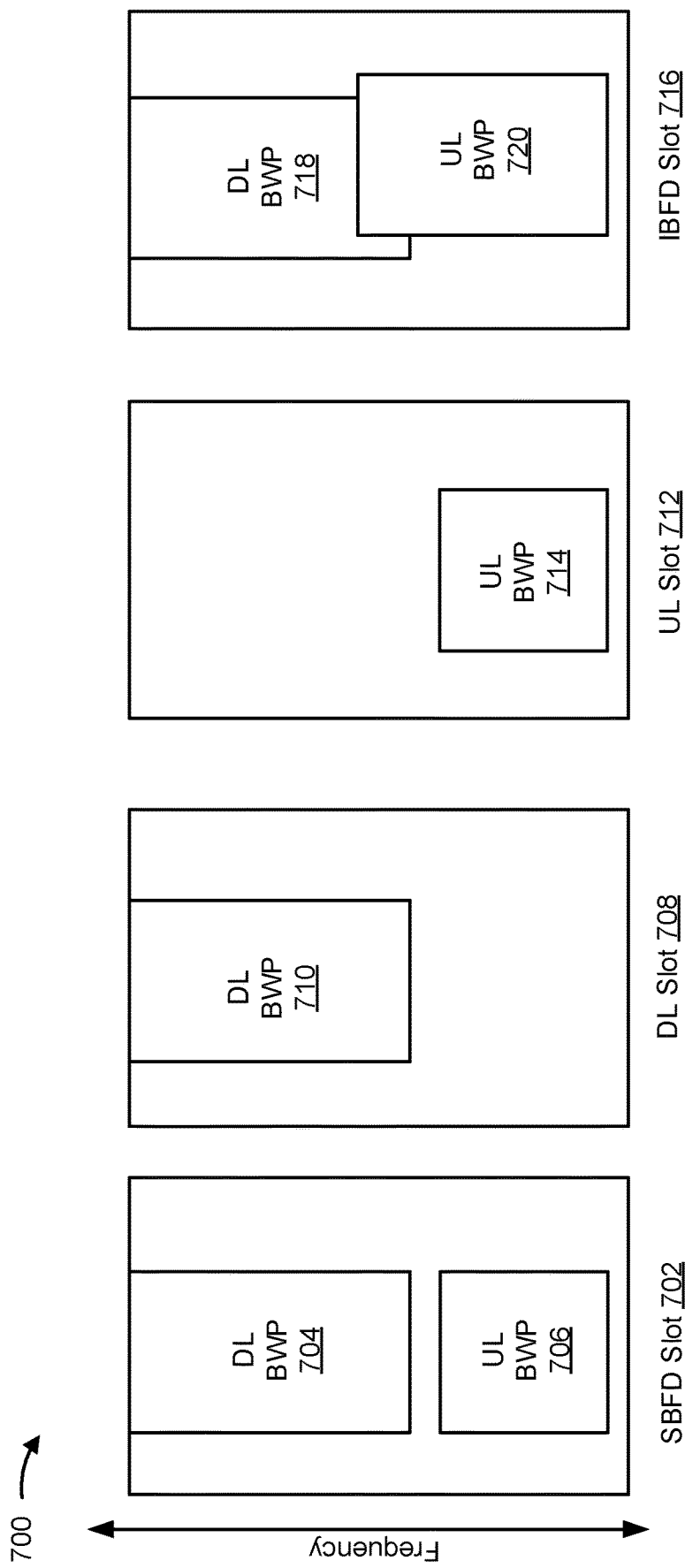
FIG. 7 is a diagram illustrating an example associated with bandwidth part based uplink and downlink communication in a time resource, in accordance with the present disclosure.

FIG. 7 is a diagram illustrating an example 700 associated with bandwidth part based uplink and downlink communication in a time resource, in accordance with the present disclosure. FIG. 7 shows various slot formats, such as an SBFD slot 702 in which a DL BWP 704 and an UL BWP 706 are simultaneously active and separated by a guard band (e.g., the DL BWP 704 and the UL BWP 706 do not overlap in the frequency domain), a DL slot 708 in which only a DL BWP 710 (and not an UL BWP) is active, an UL slot 712 in which only an UL BWP 714 (and not a DL BWP) is active, and an IBFD slot 716 in which a DL BWP 718 and an UL BWP 720 are simultaneously active and overlap partially in the frequency domain.

As described above in connection with FIG. 6, an indication from a base station 110 to a UE 120 may indicate that an UL BWP is to be active in a DL slot 708 (e.g., based at least in part on receiving DCI that schedules an uplink communication in the DL slot 708). In some aspects, the base station 110 and/or the UE 120 may determine whether the RRC flag is in an active state. If the RRC flag is in an active state, then the UE 120 may determine that the DL slot 708 should have an SBFD format (e.g., rather than a downlink format). In some aspects, the base station 110 and/or the UE 120 may review information (e.g., a bitmap) that indicates the types of BWPs supported by one or more of the slots. For example, a bitmap may contain a "1" to indicate a slot where DL BWPs can be active (or where at least one DL BWP is to be active) and a "0" to indicate a slot where DL BWPs cannot be active (or where no DL BWP is to be active). In the example 700 of FIG. 7, the bitmap for slots 702, 708, 712 and 716 may be represented as 1101. It is understood that the bitmap may additionally, or alternatively represent the active and inactive UL BWPs. For example, in example 700, a bitmap for UL BWPs may be represented as 1011, as described in more detail below. Upon receiving an indication that an UL BWP should be active in slot 708, the UE may convert slot 708 to an SBFD slot by activating an UL BWP (not shown) in the slot 708 in addition to the DL BWP 710. The UE 120 may convert slot 708 to an SBFD slot (e.g., a slot have an SBFD format) based at least in part on the indication, based at least in part on the RRC flag, based at least in part on the bitmap, and/or any combination of the above. The UE 120 may use a set of parameters associated with a full-duplex mode based at least in part on slot 708 being an SBFD slot. As described above, an SBFD slot may refer to a slot having an SBFD format.

In some aspects, an indication from the base station 110 to the UE 120 may indicate that a DL BWP is to be active in an UL slot 712 (e.g., based at least in part on receiving DCI that schedules a downlink communication in the UL slot 712). In some aspects, the base station 110 and/or the UE 120 may determine whether the RRC flag is in an active state. If the flag is in an active state, the UE 120 may determine that the UL slot 712 should have an SBFD format (e.g., rather than an uplink format). In some aspects, the base station 110 and/or the UE 120 may review information (e.g., a bitmap) that indicates the types of BWPs supported by one or more of the slots. For example, a bitmap may contain a "1" to indicate a slot where UL BWPs can be active (or where at least one UL BWP is to be active) and a "0" to indicate a slot where UL BWPs cannot be active (or where no DL BWP is to be active). In the example 700 of FIG. 7, the bitmap for slots 702, 708, 712 and 716 may be represented as 1011. It is understood that the bitmap may additionally, or alternatively represent the active and inactive DL BWPs. Upon receiving an indication that a DL BWP should be active in slot 712, the UE may convert slot 712 to an SBFD slot by activating a DL BWP (not shown) in the slot 712 in addition to the UL BWP 714. The UE 120 may convert slot 712 to an SBFD slot (e.g., a slot having an SBFD format) based at least in part on the indication, based at least in part on the RRC flag, based at least in part on the bitmap, and/or any combination of the above.

In some aspects, the UE 120 may receive a first bitmap for UL BWPs and a second bitmap for DL BWPs, where the first bitmap and the second bitmap relate to the same set of slots (e.g., slots 702, 708, 712, 716 of FIG. 7). For example, the indication to operate using the SBFD mode may include the first bitmap and the second bitmap. The UE 120 may determine whether each slot of the set of slots has an SBFD format based at least in part on the first bitmap and the second bitmap. For example, if the first bitmap indicates that a UL BWP is active in a given slot, and the second bitmap indicates that a DL BWP is active in the given slot, then the UE 120 may use a full-duplex mode in the given slot and/or may activate or communicate using a UL BWP and a DL BWP in the given slot.

In some aspects, an indication from the base station 110 to the UE 120 may indicate that a DL BWP and an UL BWP are to be active in slot 716 (e.g., based at least in part on receiving DCI that schedules a downlink communication and an uplink communication in the slot 716). In some aspects, the base station 110 and/or the UE 120 may determine whether the RRC flag is in an active state. If the flag is in an active state, the UE 120 may determine that the slot should have an SBFD format. In some aspects, the base station 110 and/or the UE 120 may review information (e.g., a bitmap) that indicates the types of BWPs (e.g., UL or DL BWPs) supported by one or more of the slots or expected to be active in one or more of the slots. Upon receiving an indication that both the DL BWP and the UL BWP should be active in slot 716, the UE may convert slot 716 to an SBFD slot (e.g., a slot having an SBFD format) by activating the DL BWP and the UL BWP of slot 716, such that both the DL BWP and the UL BWP are active in slot 716. The UE 120 may convert slot 716 to an SBFD slot based at least in part on the indication, based at least in part on the RRC flag, based at least in part on the bitmap, and/or any combination of the above.

As indicated above, FIG. 7 is provided as an example. Other examples may differ from what is described with respect to FIG. 7.

Figure 8:
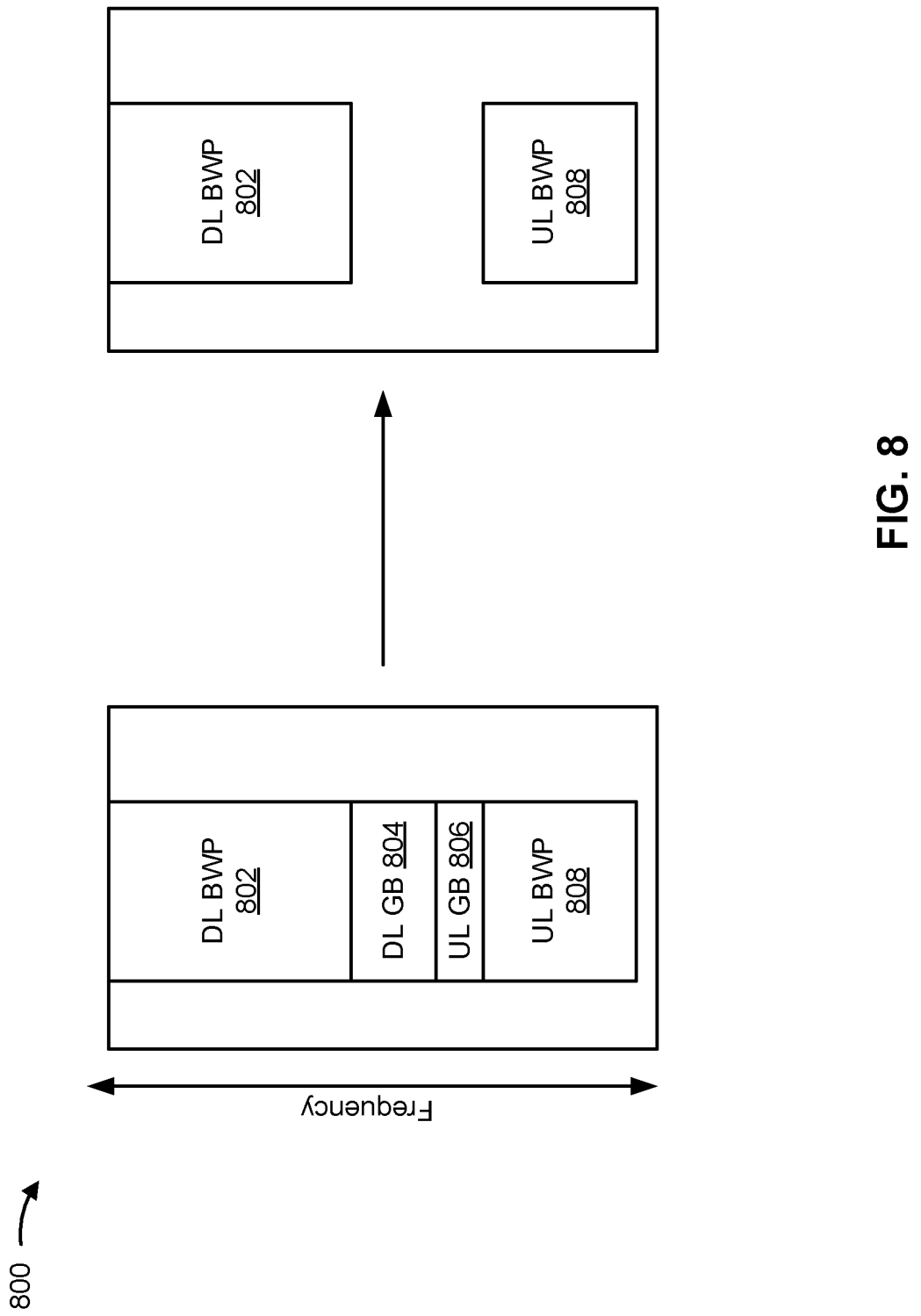
FIG. 8 is a diagram illustrating an example of reducing a bandwidth of a BWP to reduce interference, in accordance with the present disclosure.

FIG. 8 is a diagram illustrating an example 800 of reducing a bandwidth of a BWP to reduce interference, in accordance with the present disclosure. This bandwidth reduction may be performed in connection with activating an SBFD mode and/or communicating using an SBFD mode, as described above in connection with FIG. 6.

As shown in example 800 of FIG. 8, the base station 110 and/or the UE 120 may determine that a portion of the DL BWP 802 may be converted to act as a guard band between the DL BWP 802 and the UL BWP 808. This portion of the DL BWP is shown as DL guard band (GB) 804. In other words, the bandwidth of the DL BWP 802 may be reduced to accommodate a guard band between the DL BWP 802 and the UL BWP 808. Additionally, or alternatively, the base station 110 and/or the UE 120 may determine that a portion of the UL BWP 808 may be converted to act as a guard band between the DL BWP 802 and the UL BWP 808. This portion of the UL BWP is shown as UL GB 806. In other words, the bandwidth of the UL BWP 808 may be reduced to accommodate a guard band between the UL BWP 808 and the DL BWP 802. During SBFD communications, the DL GB 804 and the UL GB 806 are not to be used for transmitting information between the base station 110 and the UE 120.

In some aspects, the bandwidth of the DL BWP and/or the UL BWP may be reduced based at least in part on information included in an RRC message (such as in the configuration information described above in connection with reference number 602 or separately from the configuration information described above in connection with reference number 602). For example, the RRC message (or another message) may indicate a manner in which the bandwidth is to be reduced. For example, the RRC message may indicate a set of frequency resources (e.g., DL GB 804 and UL GB 806) that are permitted to be dropped from the DL BWP and/or the UL BWP. The base station 110 and/or the UE 120 may prioritize whether to reduce the bandwidth of the DL BWP or the UL BWP based at least in part on any number of conditions, including but not limited to the amount of expected interference, the size of an existing guard band (if any), and/or which frequency bands are permitted to be reduced. The priorities may be included in any of the messages from the base station 110 to the UE 120, such as the RRC message, the MAC-CE message, or the DCI message. It is understood that the DL GB 804 and/or the UL GB 806 may be created regardless of whether there is already an existing guard band between the DL BWP 802 and the UL BWP 808.

Reducing the portion of the bandwidth allocated to the DL BWP and/or the UL BWP, as shown in FIG. 8, may reduce or eliminate the problem of self-interference, such as by providing a guard band sufficient to contain leakage of the transmission between the base station 110 and the UE 120.

As indicated above, FIG. 8 is provided as an example. Other examples may differ from what is described with respect to FIG. 8.

Figure 9:
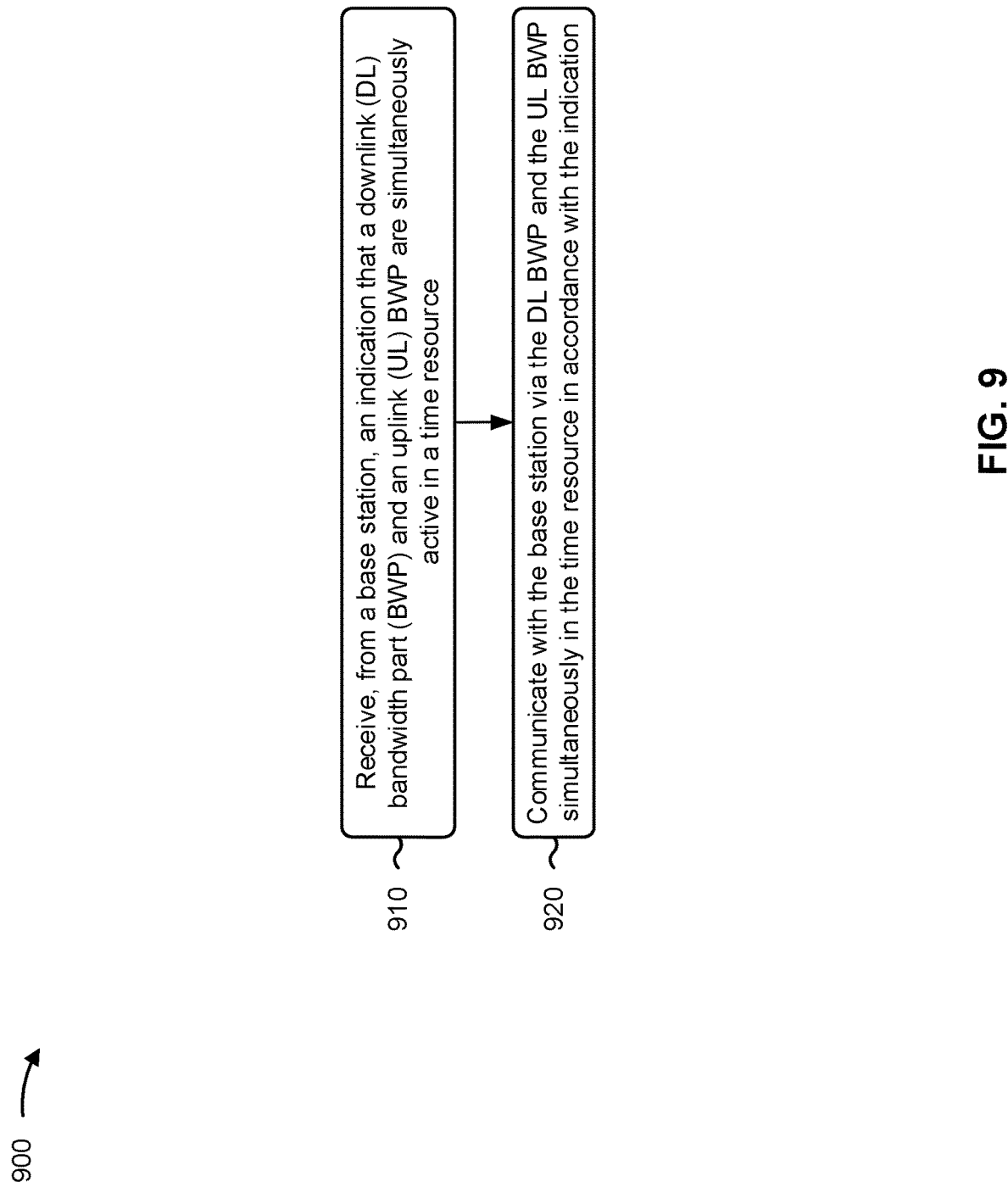
FIG. 9 is a diagram illustrating an example process performed, for example, by a UE, in accordance with the present disclosure.

FIG. 9 is a diagram illustrating an example process 900 performed, for example, by a UE, in accordance with the present disclosure. Example process 900 is an example where the UE (e.g., UE 120, an apparatus of the UE 120) performs operations associated with bandwidth part based uplink and downlink communication in a time resource.

As shown in FIG. 9, in some aspects, process 900 may include receiving, from a base station, an indication that a DL BWP and an UL BWP are simultaneously active in a time resource (block 910). For example, the UE (e.g., using communication manager 140 and/or reception component 1102, depicted in FIG. 11) may receive, from a base station, an indication that a DL BWP and an UL BWP are simultaneously active in a time resource, as described above.

As further shown in FIG. 9, in some aspects, process 900 may include communicating with the base station via the DL BWP and the UL BWP simultaneously in the time resource in accordance with the indication (block 920). For example, the UE (e.g., using communication manager 140, reception component 1102 and/or transmission component 1104, depicted in FIG. 11) may communicate with the base station via the DL BWP and the UL BWP simultaneously in the time resource in accordance with the indication, as described above.

Process 900 may include additional aspects, such as any single aspect or any combination of aspects described below and/or in connection with one or more other processes described elsewhere herein.

In a first aspect, the indication is included in at least one of a radio resource control (RRC) message, a medium access control (MAC) control element (CE), or downlink control information (DCI).

In a second aspect, alone or in combination with the first aspect, the UE is configured with a RRC flag that specifies whether the DL BWP and the UL BWP can be simultaneously activated.

In a third aspect, alone or in combination with one or more of the first and second aspects, process 900 includes activating, based at least in part on the RRC flag specifying that the DL BWP and the UL BWP can be simultaneously activated, the DL BWP and the UL BWP in accordance with the indication.

In a fourth aspect, alone or in combination with one or more of the first through third aspects, process 900 includes de-activating, based at least in part on receiving a second indication that the DL BWP and the UL BWP are no longer simultaneously active, at least one of the DL BWP and the UL BWP in accordance with the second indication.

In a fifth aspect, alone or in combination with one or more of the first through fourth aspects, process 900 includes activating, in accordance with the RRC flag, both the DL BWP and the UL BWP simultaneously.

In a sixth aspect, alone or in combination with one or more of the first through fifth aspects, process 900 includes de-activating, based at least in part on receiving a second indication that the DL BWP and the UL BWP are no longer simultaneously active, at least one of the DL BWP and the UL BWP.

In a seventh aspect, alone or in combination with one or more of the first through sixth aspects, the indication is included in downlink control information that schedules at least one of a physical downlink shared channel or a physical uplink shared channel.

In an eighth aspect, alone or in combination with one or more of the first through seventh aspects, the indication includes reception of downlink control information (DCI) that schedules a physical uplink shared channel (PUSCH) communication in the time resource, wherein the time resource is configured as a downlink time resource prior to reception of the DCI.

In a ninth aspect, alone or in combination with one or more of the first through eighth aspects, process 900 includes activating the UL BWP in the time resource, in which the DL BWP is already activated, based at least in part on receiving the DCI that schedules the PUSCH communication.

In a tenth aspect, alone or in combination with one or more of the first through ninth aspects, the indication includes reception of downlink control information (DCI) that schedules a physical downlink shared channel (PDSCH) communication in the time resource, wherein the time resource is configured as an uplink time resource prior to reception of the DCI.

In an eleventh aspect, alone or in combination with one or more of the first through tenth aspects, process 900 includes activating the DL BWP in the time resource, in which the UL BWP is already activated, based at least in part on receiving the DCI that schedules the PDSCH communication.

In a twelfth aspect, alone or in combination with one or more of the first through eleventh aspects, the indication includes reception of downlink control information (DCI) that schedules both a physical downlink shared channel (PDSCH) communication and a physical uplink shared channel (PUSCH) communication in the time resource.

In a thirteenth aspect, alone or in combination with one or more of the first through twelfth aspects, process 900 includes activating one of the DL BWP or the UL BWP in the time resource, in which the other of the DL BWP or the UL BWP is already activated, based at least in part on receiving the DCI that schedules both the PDSCH communication and the PUSCH communication.

In a fourteenth aspect, alone or in combination with one or more of the first through thirteenth aspects, process 900 includes maintaining the DL BWP and the UL BWP as active until an end of the time resource.

In a fifteenth aspect, alone or in combination with one or more of the first through fourteenth aspects, process 900 includes maintaining the DL BWP and the UL BWP as active until an indication to operate in half duplex mode is received.

In a sixteenth aspect, alone or in combination with one or more of the first through fifteenth aspects, process 900 includes maintaining the DL BWP and the UL BWP as active until an expiration of a timer.

In a seventeenth aspect, alone or in combination with one or more of the first through sixteenth aspects, process 900 includes reducing a bandwidth of at least one of the DL BWP or the UL BWP.

In an eighteenth aspect, alone or in combination with one or more of the first through seventeenth aspects, the bandwidth of the at least one of the DL BWP or the UL BWP is reduced based at least in part on an interference condition being satisfied.

In a nineteenth aspect, alone or in combination with one or more of the first through eighteenth aspects, the interference condition being satisfied comprises a threshold associated with an interference measurement being satisfied.

In a twentieth aspect, alone or in combination with one or more of the first through nineteenth aspects, the bandwidth of the at least one of the DL BWP or the UL BWP is reduced based at least in part on a determination that a guard interval between the DL BWP and the UL BWP cannot support simultaneous communication on the UL BWP and the DL BWP.

In a twenty-first aspect, alone or in combination with one or more of the first through twentieth aspects, process 900 includes receiving a radio resource control (RRC) message indicating a manner in which the bandwidth is to be reduced.

In a twenty-second aspect, alone or in combination with one or more of the first through twenty-first aspects, the radio resource control (RRC) message indicates a set of frequency bands that are permitted to be dropped from the at least one of the DL BWP or the UL BWP.

In a twenty-third aspect, alone or in combination with one or more of the first through twenty-second aspects, communicating with the base station via the DL BWP and the UL BWP simultaneously in the time resource further comprises communicating in the time resource in a full-duplex mode.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
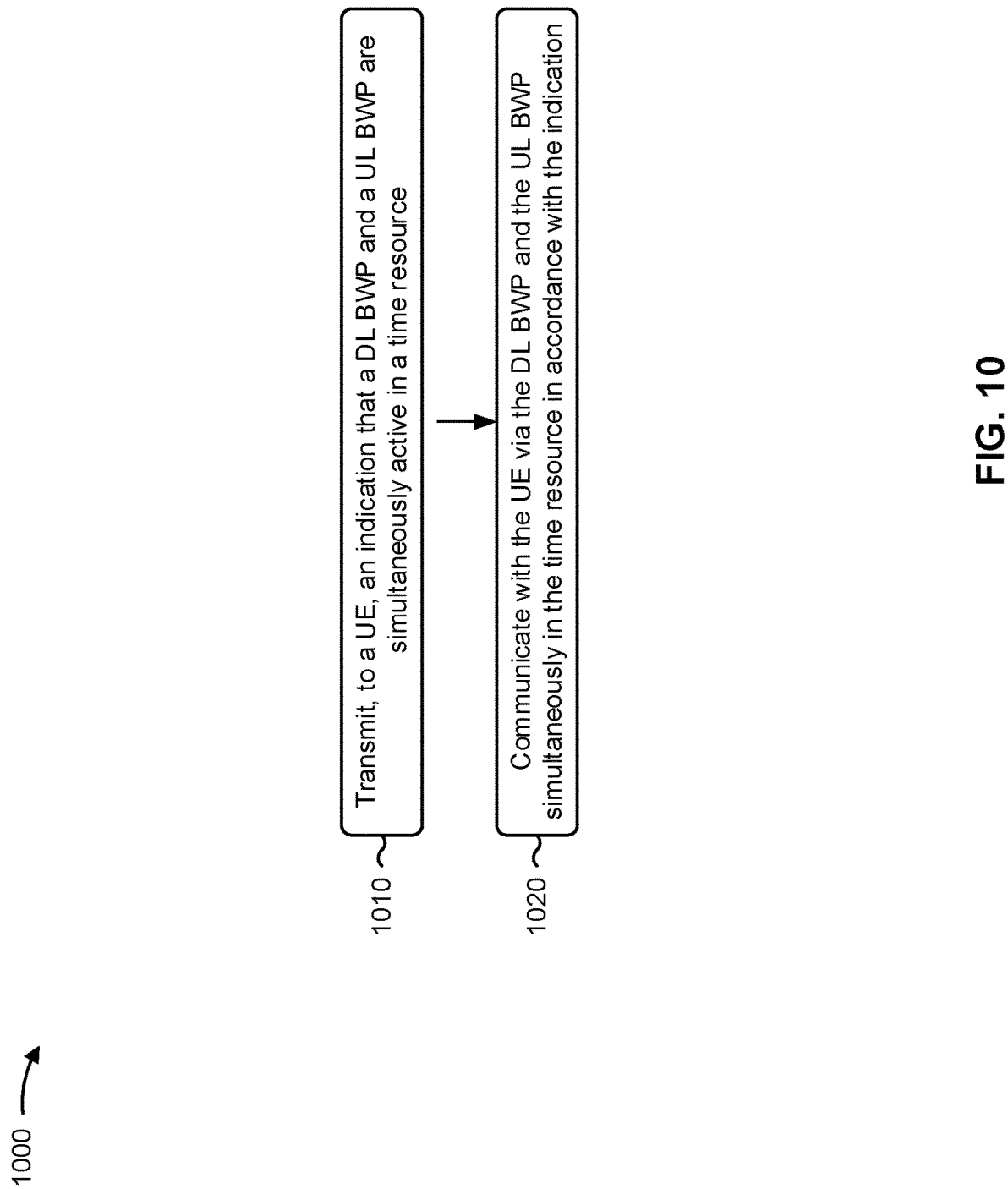
FIG. 10 is a diagram illustrating an example process performed, for example, by a base station, in accordance with the present disclosure.

FIG. 10 is a diagram illustrating an example process 1000 performed, for example, by a base station, in accordance with the present disclosure. Example process 1000 is an example where the base station (e.g., base station 110) performs operations associated with bandwidth part based uplink and downlink communication in a time resource.

As shown in FIG. 10, in some aspects, process 1000 may include transmitting, to a UE, an indication that a DL BWP and an UL BWP are simultaneously active in a time resource (block 1010). For example, the base station (e.g., using communication manager 150 and/or transmission component 1204, depicted in FIG. 12) may transmit, to a UE, an indication that a DL BWP and an UL BWP are simultaneously active in a time resource, as described above.

As further shown in FIG. 10, in some aspects, process 1000 may include communicating with the UE via the DL BWP and the UL BWP simultaneously in the time resource in accordance with the indication (block 1020). For example, the base station (e.g., using communication manager 150, reception component 1202, and/or transmission component 1204, depicted in FIG. 12) may communicate with the UE via the DL BWP and the UL BWP simultaneously in the time resource in accordance with the indication, as described above.

Process 1000 may include additional aspects, such as any single aspect or any combination of aspects described below and/or in connection with one or more other processes described elsewhere herein.

In a first aspect, the indication is included in at least one of a radio resource control (RRC) message, a medium access control (MAC) control element (CE), or downlink control information (DCI).

In a second aspect, alone or in combination with the first aspect, the UE is configured with a radio resource control (RRC) flag that specifies whether the DL BWP and the UL BWP can be simultaneously activated.

In a third aspect, alone or in combination with one or more of the first and second aspects, process 1000 includes transmitting a second indication that the DL BWP and the UL BWP are no longer simultaneously active.

In a fourth aspect, alone or in combination with one or more of the first through third aspects, the indication is included in downlink control information that schedules at least one of a physical downlink shared channel or a physical uplink shared channel.

In a fifth aspect, alone or in combination with one or more of the first through fourth aspects, the indication includes reception of downlink control information (DCI) that schedules a physical uplink shared channel (PUSCH) communication in the time resource, wherein the time resource is configured as a downlink time resource prior to reception of the DCI.

In a sixth aspect, alone or in combination with one or more of the first through fifth aspects, the indication includes reception of downlink control information (DCI) that schedules a physical downlink shared channel (PDSCH) communication in the time resource, wherein the time resource is configured as an uplink time resource prior to reception of the DCI.

In a seventh aspect, alone or in combination with one or more of the first through sixth aspects, the indication includes reception of downlink control information (DCI) that schedules both a PDSCH communication and a PUSCH communication in the time resource.

In an eighth aspect, alone or in combination with one or more of the first through seventh aspects, the DL BWP and the UL BWP are active until an end of the time resource.

In a ninth aspect, alone or in combination with one or more of the first through eighth aspects, the DL BWP and the UL BWP are active until an indication to operate in half duplex mode is transmitted.

In a tenth aspect, alone or in combination with one or more of the first through ninth aspects, the DL BWP and the UL BWP are active until an expiration of a timer.

In an eleventh aspect, alone or in combination with one or more of the first through tenth aspects, process 1000 includes transmitting a radio resource control (RRC) message indicating a manner in which a bandwidth of at least one of the DL BWP or the UL BWP.

In a twelfth aspect, alone or in combination with one or more of the first through eleventh aspects, the radio resource control (RRC) message indicates a set of frequency bands that are permitted to be dropped from the at least one of the DL BWP or the UL BWP.

In a thirteenth aspect, alone or in combination with one or more of the first through twelfth aspects, communicating with the UE via the DL BWP and the UL BWP simultaneously in the time resource further comprises communicating in the time resource in a full-duplex mode.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
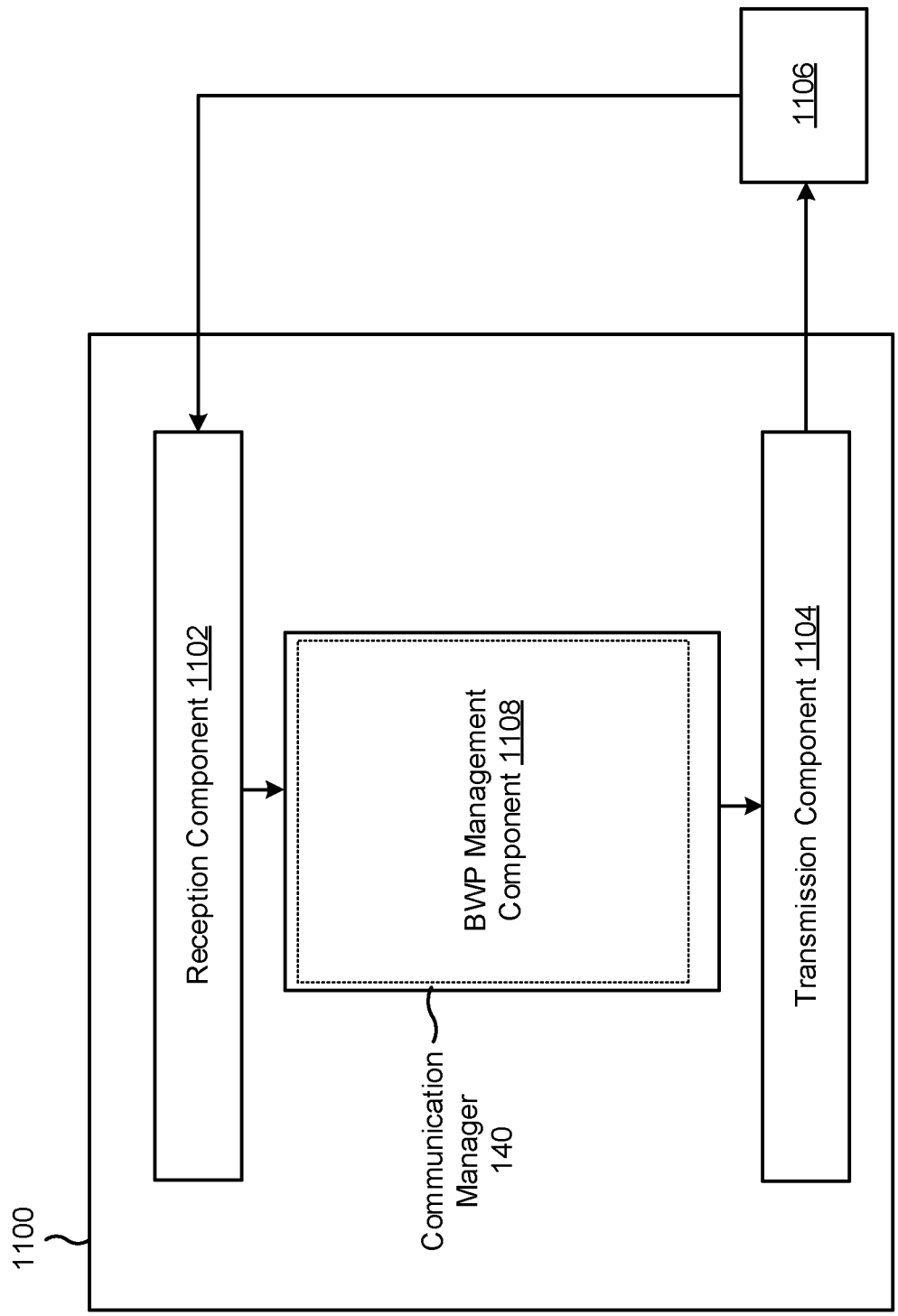
FIG. 11 is a diagram of an example apparatus for wireless communication, in accordance with the present disclosure.

FIG. 11 is a diagram of an example apparatus 1100 for wireless communication, in accordance with the present disclosure. The apparatus 1100 may be a UE, or a UE may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 140. The communication manager 140 may include one or more of a BWP management component 1108, among other examples.

In some aspects, the apparatus 1100 may be configured to perform one or more operations described herein in connection with FIGS. 3-8. Additionally, or alternatively, the apparatus 1100 may be configured to perform one or more processes described herein, such as process 900 of FIG. 9, or a combination thereof. In some aspects, the apparatus 1100 and/or one or more components shown in FIG. 11 may include one or more components of the UE described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the UE described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the UE described in connection with FIG. 2. In some aspects, the transmission component 1104 may be co-located with the reception component 1102 in a transceiver.

The reception component 1102 may receive, from a base station, an indication that a downlink (DL) bandwidth part (BWP) and an uplink (UL) BWP are simultaneously active in a time resource. The reception component 1102 or the transmission component 1104 may communicate with the base station via the DL BWP and the UL BWP simultaneously in the time resource in accordance with the indication.

The BWP management component 1108 may activate, based at least in part on the RRC flag specifying that the DL BWP and the UL BWP can be simultaneously activated, the DL BWP and the UL BWP in accordance with the indication.

The BWP management component 1108 may activate, in accordance with the RRC flag, both the DL BWP and the UL BWP simultaneously.

The BWP management component 1108 may activate the UL BWP in the time resource, in which the DL BWP is already activated, based at least in part on receiving the DCI that schedules the PUSCH communication.

The BWP management component 1108 may activate the DL BWP in the time resource, in which the UL BWP is already activated, based at least in part on receiving the DCI that schedules the PDSCH communication.

The BWP management component 1108 may activate one of the DL BWP or the UL BWP in the time resource, in which the other of the DL BWP or the UL BWP is already activated, based at least in part on receiving the DCI that schedules both the PDSCH communication and the PUSCH communication.

The BWP management component 1108 may maintain the DL BWP and the UL BWP as active until an end of the time resource.

The BWP management component 1108 may maintain the DL BWP and the UL BWP as active until an indication to operate in half duplex mode is received.

The BWP management component 1108 may maintain the DL BWP and the UL BWP as active until an expiration of a timer.

The BWP management component 1108 may reduce a bandwidth of at least one of the DL BWP or the UL BWP.

The reception component 1102 may receive a radio resource control (RRC) message indicating a manner in which the bandwidth is to be reduced.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
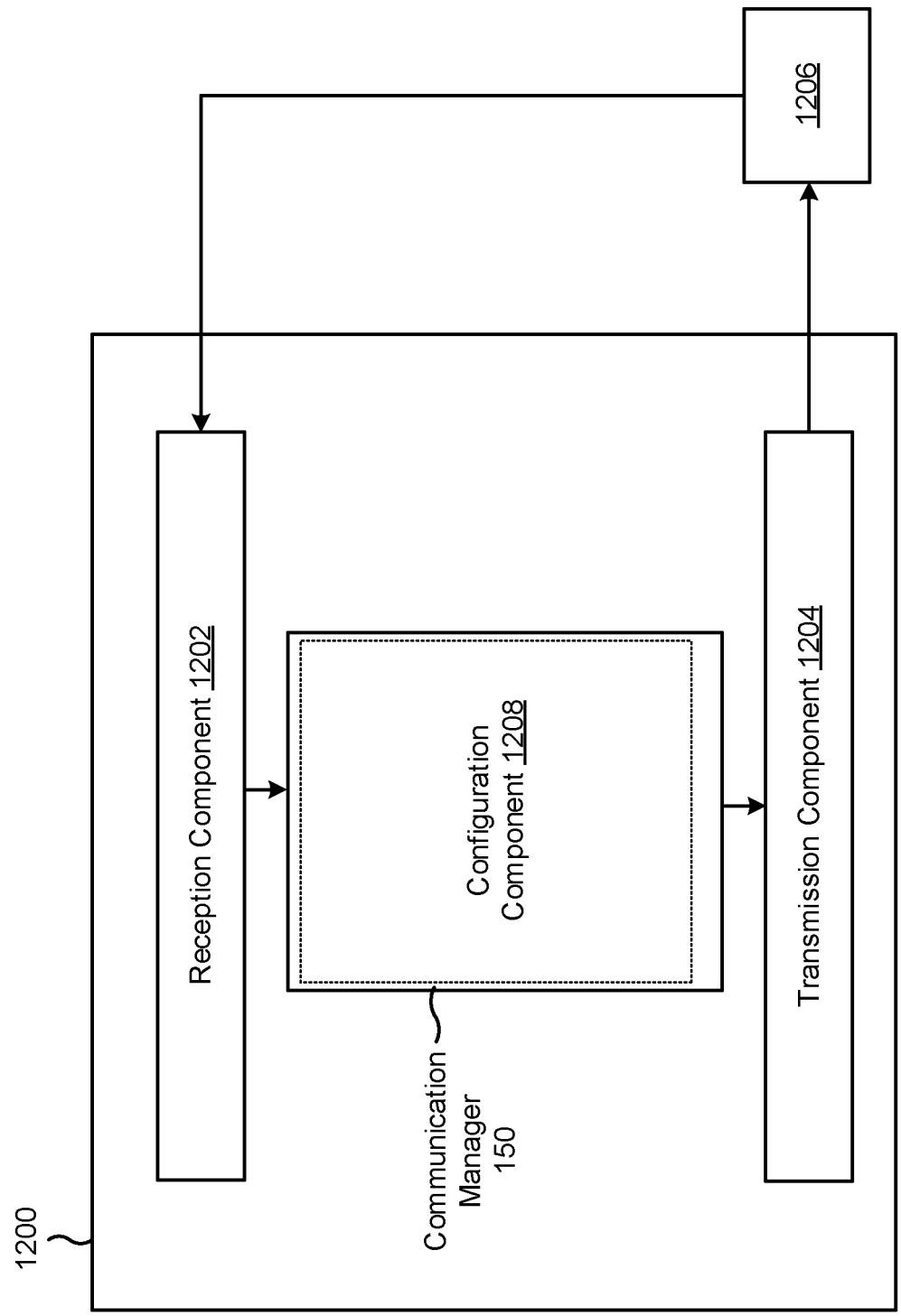
FIG. 12 is a diagram of an example apparatus for wireless communication, in accordance with the present disclosure.

FIG. 12 is a diagram of an example apparatus 1200 for wireless communication, in accordance with the present disclosure. The apparatus 1200 may be a base station, or a base station may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include the communication manager 150. The communication manager 150 may include one or more of a configuration component 1208, among other examples.

In some aspects, the apparatus 1200 may be configured to perform one or more operations described herein in connection with FIGS. 3-8. Additionally, or alternatively, the apparatus 1200 may be configured to perform one or more processes described herein, such as process 1000 of FIG. 10, or a combination thereof. In some aspects, the apparatus 1200 and/or one or more components shown in FIG. 12 may include one or more components of the base station described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the base station described in connection with FIG. 2.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the base station described in connection with FIG. 2. In some aspects, the transmission component 1204 may be co-located with the reception component 1202 in a transceiver.

The transmission component 1204 may transmit, to a UE, an indication that a DL BWP and an UL BWP are simultaneously active in a time resource. The reception component 1202 or the transmission component 1204 may communicate with the UE via the DL BWP and the UL BWP simultaneously in the time resource in accordance with the indication.

The transmission component 1204 may transmit a second indication that the DL BWP and the UL BWP are no longer simultaneously active.

The transmission component 1204 may transmit a radio resource control (RRC) message indicating a manner in which a bandwidth of at least one of the DL BWP or the UL BWP.

The configuration component 1208 may transmit configuration information, such as the configuration information shown by reference number 602 in FIG. 6, information indicating an RRC flag, or the like.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by a user equipment (UE), comprising: receiving, from a base station, an indication that a downlink (DL) bandwidth part (BWP) and an uplink (UL) BWP are simultaneously active in a time resource; and communicating with the base station via the DL BWP and the UL BWP simultaneously in the time resource in accordance with the indication.

Aspect 2: The method of Aspect 1, wherein the indication is included in at least one of a radio resource control (RRC) message, a medium access control (MAC) control element (CE), or downlink control information (DCI).

Aspect 3: The method of any of Aspects 1-2, wherein the UE is configured with a radio resource control (RRC) flag that specifies whether the DL BWP and the UL BWP can be simultaneously activated.

Aspect 4: The method of Aspect 3, further comprising activating, based at least in part on the RRC flag specifying that the DL BWP and the UL BWP can be simultaneously activated, the DL BWP and the UL BWP in accordance with the indication.

Aspect 5: The method of Aspect 4, further comprising de-activating, based at least in part on receiving a second indication that the DL BWP and the UL BWP are no longer simultaneously active, at least one of the DL BWP and the UL BWP in accordance with the second indication.

Aspect 6: The method of Aspect 3, further comprising activating, in accordance with the RRC flag, both the DL BWP and the UL BWP simultaneously.

Aspect 7: The method of Aspect 6, further comprising de-activating, based at least in part on receiving a second indication that the DL BWP and the UL BWP are no longer simultaneously active, at least one of the DL BWP and the UL BWP.

Aspect 8: The method of any of Aspects 1-7, wherein the indication is included in downlink control information that schedules at least one of a physical downlink shared channel or a physical uplink shared channel.

Aspect 9: The method of any of Aspects 1-8, wherein the indication includes reception of downlink control information (DCI) that schedules a physical uplink shared channel (PUSCH) communication in the time resource, wherein the time resource is configured as a downlink time resource prior to reception of the DCI.

Aspect 10: The method of Aspect 9, further comprising activating the UL BWP in the time resource, in which the DL BWP is already activated, based at least in part on receiving the DCI that schedules the PUSCH communication.

Aspect 11: The method of any of Aspects 1-10, wherein the indication includes reception of downlink control information (DCI) that schedules a physical downlink shared channel (PDSCH) communication in the time resource, wherein the time resource is configured as an uplink time resource prior to reception of the DCI.

Aspect 12: The method of Aspect 11, further comprising activating the DL BWP in the time resource, in which the UL BWP is already activated, based at least in part on receiving the DCI that schedules the PDSCH communication.

Aspect 13: The method of any of Aspects 1-12, wherein the indication includes reception of downlink control information (DCI) that schedules both a physical downlink shared channel (PDSCH) communication and a physical uplink shared channel (PUSCH) communication in the time resource.

Aspect 14: The method of Aspect 13, further comprising activating one of the DL BWP or the UL BWP in the time resource, in which the other of the DL BWP or the UL BWP is already activated, based at least in part on receiving the DCI that schedules both the PDSCH communication and the PUSCH communication.

Aspect 15: The method of any of Aspects 1-14, further comprising maintaining the DL BWP and the UL BWP as active until an end of the time resource.

Aspect 16: The method of any of Aspects 1-15, further comprising maintaining the DL BWP and the UL BWP as active until an indication to operate in half duplex mode is received.

Aspect 17: The method of any of Aspects 1-16, further comprising maintaining the DL BWP and the UL BWP as active until an expiration of a timer.

Aspect 18: The method of any of Aspects 1-17, further comprising reducing a bandwidth of at least one of the DL BWP or the UL BWP.

Aspect 19: The method of Aspect 18, wherein the bandwidth of the at least one of the DL BWP or the UL BWP is reduced based at least in part on an interference condition being satisfied.

Aspect 20: The method of Aspect 19, wherein the interference condition being satisfied comprises a threshold associated with an interference measurement being satisfied.

Aspect 21: The method of Aspect 18, wherein the bandwidth of the at least one of the DL BWP or the UL BWP is reduced based at least in part on a determination that a guard interval between the DL BWP and the UL BWP cannot support simultaneous communication on the UL BWP and the DL BWP.

Aspect 22: The method of Aspect 18, further comprising receiving a radio resource control (RRC) message indicating a manner in which the bandwidth is to be reduced.

Aspect 23: The method of Aspect 22, wherein the radio resource control (RRC) message indicates a set of frequency bands that are permitted to be dropped from the at least one of the DL BWP or the UL BWP.

Aspect 24: The method of any of Aspects 1-23, wherein communicating with the base station via the DL BWP and the UL BWP simultaneously in the time resource further comprises communicating in the time resource in a full-duplex mode.

Aspect 25: A method of wireless communication performed by a base station, comprising: transmitting, to a user equipment (UE), an indication that a downlink (DL) bandwidth part (BWP) and an uplink (UL) BWP are simultaneously active in a time resource; and communicating with the UE via the DL BWP and the UL BWP simultaneously in the time resource in accordance with the indication.

Aspect 26: The method of Aspect 25, wherein the indication is included in at least one of a radio resource control (RRC) message, a medium access control (MAC) control element (CE), or downlink control information (DCI).

Aspect 27: The method of any of Aspects 25-26, wherein the UE is configured with a radio resource control (RRC) flag that specifies whether the DL BWP and the UL BWP can be simultaneously activated.

Aspect 28: The method of any of Aspects 25-27, further comprising transmitting a second indication that the DL BWP and the UL BWP are no longer simultaneously active.

Aspect 29: The method of any of Aspects 25-28, wherein the indication is included in downlink control information that schedules at least one of a physical downlink shared channel or a physical uplink shared channel.

Aspect 30: The method of any of Aspects 25-29, wherein the indication includes reception of downlink control information (DCI) that schedules a physical uplink shared channel (PUSCH) communication in the time resource, wherein the time resource is configured as a downlink time resource prior to reception of the DCI.

Aspect 31: The method of any Aspects 25-30, wherein the indication includes reception of downlink control information (DCI) that schedules a physical downlink shared channel (PDSCH) communication in the time resource, wherein the time resource is configured as an uplink time resource prior to reception of the DCI.

Aspect 32: The method of any of Aspects 25-31, wherein the indication includes reception of downlink control information (DCI) that schedules both a PDSCH communication and a PUSCH communication in the time resource.

Aspect 33: The method of any of Aspects 25-32, wherein the DL BWP and the UL BWP are active until an end of the time resource.

Aspect 34: The method of any of Aspects 25-33, wherein the DL BWP and the UL BWP are active until an indication to operate in half duplex mode is transmitted.

Aspect 35: The method of any of Aspects 25-34, wherein the DL BWP and the UL BWP are active until an expiration of a timer.

Aspect 36: The method of any of Aspects 25-35, further comprising transmitting a radio resource control (RRC) message indicating a manner in which a bandwidth of at least one of the DL BWP or the UL BWP.

Aspect 37: The method of Aspect 36, wherein the radio resource control (RRC) message indicates a set of frequency bands that are permitted to be dropped from the at least one of the DL BWP or the UL BWP.

Aspect 38: The method of any of Aspects 25-37, wherein communicating with the UE via the DL BWP and the UL BWP simultaneously in the time resource further comprises communicating in the time resource in a full-duplex mode.

Aspect 39: An apparatus for wireless communication at a device, comprising a processor; memory coupled with the processor; and instructions stored in the memory and executable by the processor to cause the apparatus to perform the method of one or more of Aspects 1-24.

Aspect 40: A device for wireless communication, comprising a memory and one or more processors coupled to the memory, the one or more processors configured to perform the method of one or more of Aspects 1-24.

Aspect 41: An apparatus for wireless communication, comprising at least one means for performing the method of one or more of Aspects 1-24.

Aspect 42: A non-transitory computer-readable medium storing code for wireless communication, the code comprising instructions executable by a processor to perform the method of one or more of Aspects 1-24.

Aspect 43: A non-transitory computer-readable medium storing a set of instructions for wireless communication, the set of instructions comprising one or more instructions that, when executed by one or more processors of a device, cause the device to perform the method of one or more of Aspects 1-24.

Aspect 44: An apparatus for wireless communication at a device, comprising a processor; memory coupled with the processor; and instructions stored in the memory and executable by the processor to cause the apparatus to perform the method of one or more of Aspects 25-38.

Aspect 45: A device for wireless communication, comprising a memory and one or more processors coupled to the memory, the one or more processors configured to perform the method of one or more of Aspects 25-38.

Aspect 46: An apparatus for wireless communication, comprising at least one means for performing the method of one or more of Aspects 25-38.

Aspect 47: A non-transitory computer-readable medium storing code for wireless communication, the code comprising instructions executable by a processor to perform the method of one or more of Aspects 25-38.

Aspect 48: A non-transitory computer-readable medium storing a set of instructions for wireless communication, the set of instructions comprising one or more instructions that, when executed by one or more processors of a device, cause the device to perform the method of one or more of Aspects 25-38.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
   one or more memories; and
   one or more processors, coupled to the one or more memories, configured to:
      receive, from a base station, an indication that a downlink (DL) bandwidth part (BWP) and an uplink (UL) BWP are simultaneously active in a time resource, wherein the UE is configured with a radio resource control (RRC) flag that specifies whether the DL BWP and the UL BWP can be simultaneously activated; and
      communicate with the base station via the DL BWP and the UL BWP simultaneously in the time resource in accordance with the indication.

2. The apparatus of claim 1, wherein the indication is included in at least one of an RRC message, a medium access control (MAC) control element (CE), or downlink control information (DCI).

3. The apparatus of claim 1 wherein the one or more processors are further configured to activate, based at least in part on the RRC flag specifying that the DL BWP and the UL BWP can be simultaneously activated, the DL BWP and the UL BWP in accordance with the indication.

4. The apparatus of claim 3, wherein the one or more processors are further configured to de-activate, based at least in part on receiving a second indication that the DL BWP and the UL BWP are no longer simultaneously active, at least one of the DL BWP and the UL BWP in accordance with the second indication.

5. The apparatus of claim 1 wherein the one or more processors are further configured to activate, in accordance with the RRC flag, both the DL BWP and the UL BWP simultaneously.

6. The apparatus of claim 5, wherein the one or more processors are further configured to de-activate, based at least in part on receiving a second indication that the DL BWP and the UL BWP are no longer simultaneously active, at least one of the DL BWP and the UL BWP.

7. The apparatus of claim 1, wherein the indication is included in downlink control information that schedules at least one of a physical downlink shared channel or a physical uplink shared channel.

8. The apparatus of claim 1, wherein the indication includes reception of downlink control information (DCI) that schedules a physical uplink shared channel (PUSCH) communication in the time resource, wherein the time resource is configured as a downlink time resource prior to reception of the DCI.

9. The apparatus of claim 1, wherein the indication includes reception of downlink control information (DCI) that schedules a physical downlink shared channel (PDSCH) communication in the time resource, wherein the time resource is configured as an uplink time resource prior to reception of the DCI.

10. The apparatus of claim 1, wherein the indication includes reception of downlink control information (DCI) that schedules both a physical downlink shared channel (PDSCH) communication and a physical uplink shared channel (PUSCH) communication in the time resource.

11. The apparatus of claim 1, wherein the one or more processors are further configured to maintain the DL BWP and the UL BWP as active until an end of the time resource.

12. The apparatus of claim 1, wherein the one or more processors are further configured to maintain the DL BWP and the UL BWP as active until an indication to operate in half duplex mode is received.

13. The apparatus of claim 1, wherein the one or more processors are further configured to maintain the DL BWP and the UL BWP as active until an expiration of a timer.

14. The apparatus of claim 1, wherein the one or more processors are further configured to reduce a bandwidth of at least one of the DL BWP or the UL BWP.

15. The apparatus of claim 1, wherein the one or more processors, to communicate with the base station via the DL BWP and the UL BWP simultaneously in the time resource, are configured to communicate in the time resource in a full-duplex mode.

16. An apparatus for wireless communication at a base station, comprising:
   a memory; and
   one or more processors, coupled to the memory, configured to:
      transmit, to a user equipment (UE), an indication that a downlink (DL) bandwidth part (BWP) and an uplink (UL) BWP are simultaneously active in a time resource, wherein a radio resource control (RRC) flag specifies whether the DL BWP and the UL BWP can be simultaneously activated; and
      communicate with the UE via the DL BWP and the UL BWP simultaneously in the time resource in accordance with the indication.

17. The apparatus of claim 16, wherein the one or more processors are further configured to transmit a second indication that the DL BWP and the UL BWP are no longer simultaneously active.

18. The apparatus of claim 16, wherein the indication is included in downlink control information that schedules at least one of a physical downlink shared channel or a physical uplink shared channel.

19. The apparatus of claim 16, wherein the indication includes reception of downlink control information (DCI) that schedules a physical downlink shared channel (PDSCH) communication in the time resource, wherein the time resource is configured as an uplink time resource prior to reception of the DCI.

20. The apparatus of claim 16, wherein the indication includes downlink control information (DCI) that schedules both a physical downlink shared channel (PDSCH) communication and a physical uplink shared channel (PDSCH) communication in the time resource.

21. The apparatus of claim 16, wherein the DL BWP and the UL BWP are active until an end of the time resource.

22. The apparatus of claim 16, wherein the DL BWP and the UL BWP are active until an indication to operate in half duplex mode is transmitted.

23. The apparatus of claim 22, wherein the one or more processors are further configured to transmit an RRC message indicating a manner in which a bandwidth of at least one of the DL BWP or the UL BWP is to be reduced.

24. The apparatus of claim 16, wherein the one or more processors, to communicate with the UE via the DL BWP and the UL BWP simultaneously in the time resource, are configured to communicate in the time resource in a full-duplex mode.

25. A method of wireless communication performed by a user equipment (UE), comprising:
receiving, from a base station, an indication that a downlink (DL) bandwidth part (BWP) and an uplink (UL) BWP are simultaneously active in a time resource, wherein the UE is configured with a radio resource control (RRC) flag that specifies whether the DL BWP and the UL BWP can be simultaneously activated; and
communicating with the base station via the DL BWP and the UL BWP simultaneously in the time resource in accordance with the indication.

26. The method of claim 25, wherein the indication is included in at least one of an RRC message, a medium access control (MAC) control element (CE), or downlink control information (DCI).

27. The method of claim 25, further comprising:
activating, based at least in part on the RRC flag specifying that the DL BWP and the UL BWP can be simultaneously activated, the DL BWP and the UL BWP in accordance with the indication.

28. The method of claim 25, further comprising:
activating, in accordance with the RRC flag, both the DL BWP and the UL BWP simultaneously.

29. The method of claim 25, wherein the indication is included in downlink control information that schedules at least one of a physical downlink shared channel or a physical uplink shared channel.

30. A method of wireless communication performed by a base station, comprising:
transmitting, to a user equipment (UE), an indication that a downlink (DL) bandwidth part (BWP) and an uplink (UL) BWP are simultaneously active in a time resource, wherein a radio resource control (RRC) flag specifies whether the DL BWP and the UL BWP can be simultaneously activated; and
communicating with the UE via the DL BWP and the UL BWP simultaneously in the time resource in accordance with the indication.

\* \* \* \* \*